Nov. 8, 1966    J. H. THORP    3,284,570
CASING-IN MACHINE INCLUDING PLURAL COATING MEANS
Filed Dec. 5, 1961    14 Sheets-Sheet 1

INVENTOR
JAMES H. THORP
BY *Teller, McCormick,
Paulding & Huber*
ATTORNEYS

Nov. 8, 1966 J. H. THORP 3,284,570
CASING-IN MACHINE INCLUDING PLURAL COATING MEANS
Filed Dec. 5, 1961 14 Sheets-Sheet 2

Nov. 8, 1966     J. H. THORP     3,284,570
CASING-IN MACHINE INCLUDING PLURAL COATING MEANS
Filed Dec. 5, 1961     14 Sheets-Sheet 5

Nov. 8, 1966  J. H. THORP  3,284,570
CASING-IN MACHINE INCLUDING PLURAL COATING MEANS
Filed Dec. 5, 1961  14 Sheets-Sheet 6
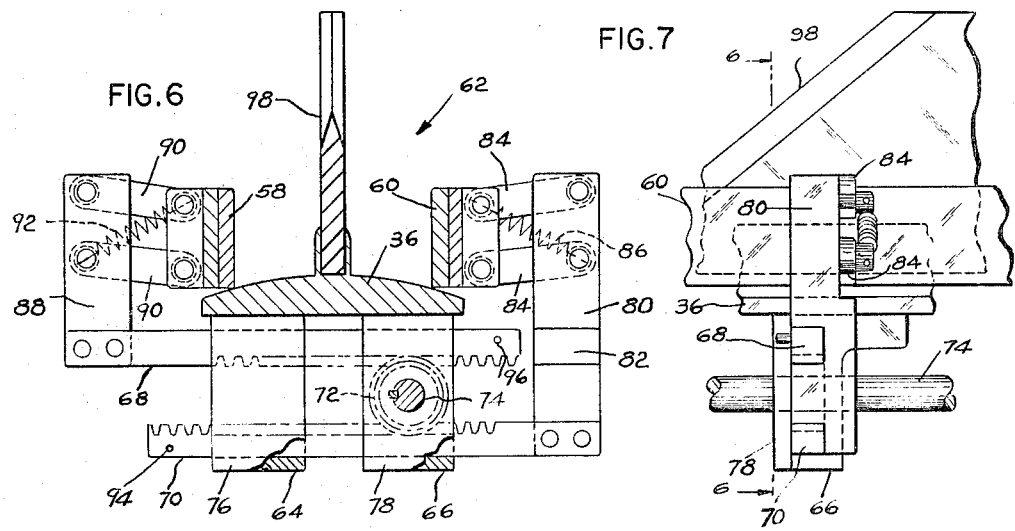
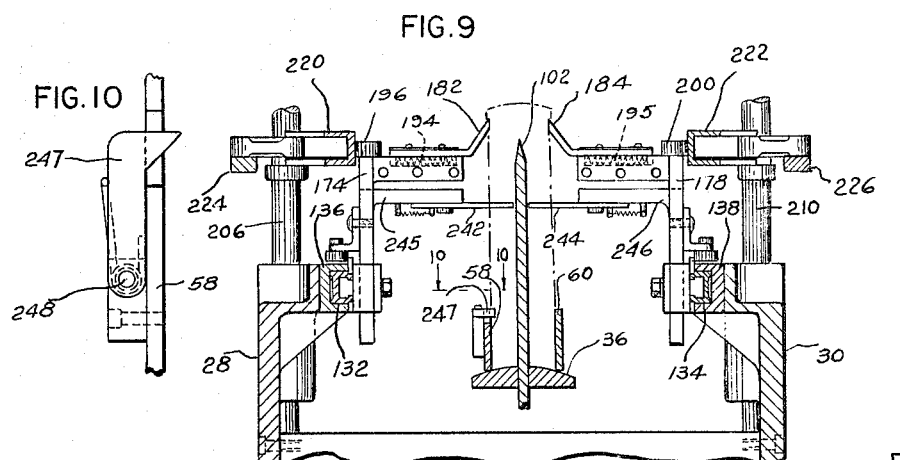
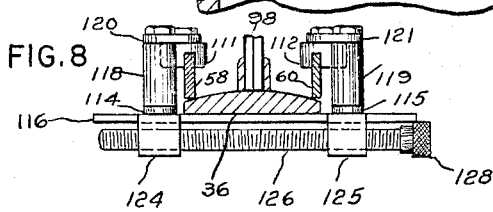
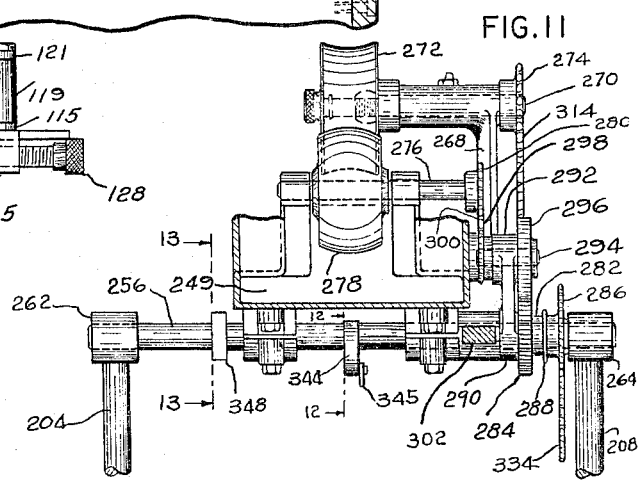

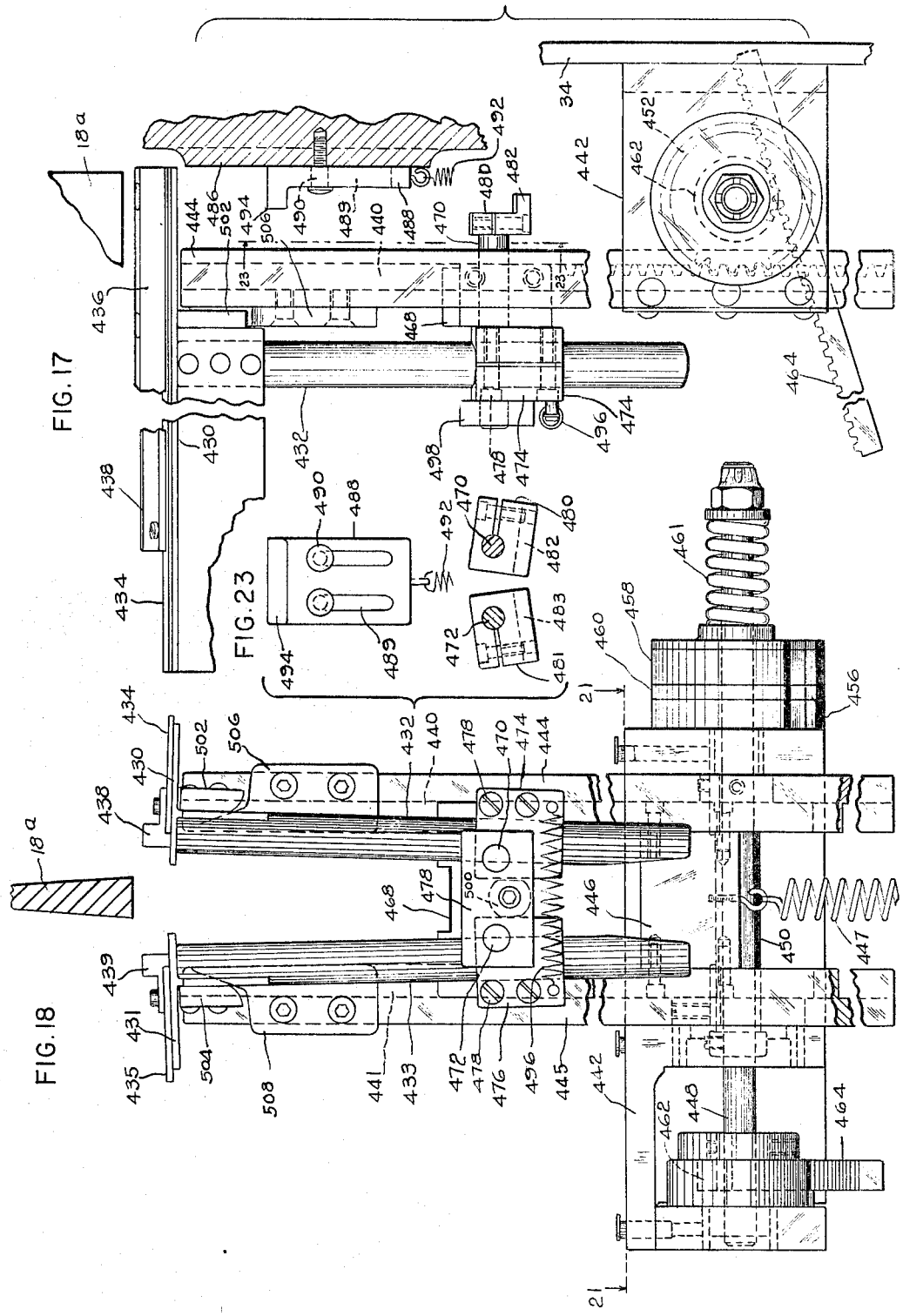

Nov. 8, 1966  J. H. THORP  3,284,570
CASING-IN MACHINE INCLUDING PLURAL COATING MEANS
Filed Dec. 5, 1961  14 Sheets-Sheet 9

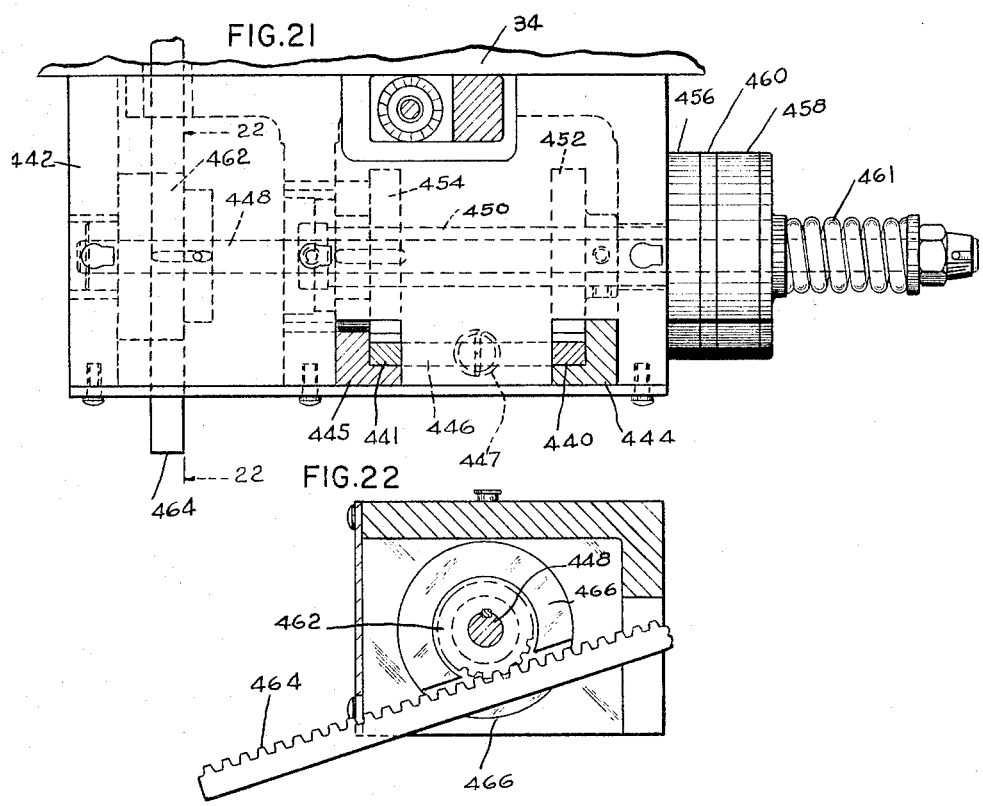

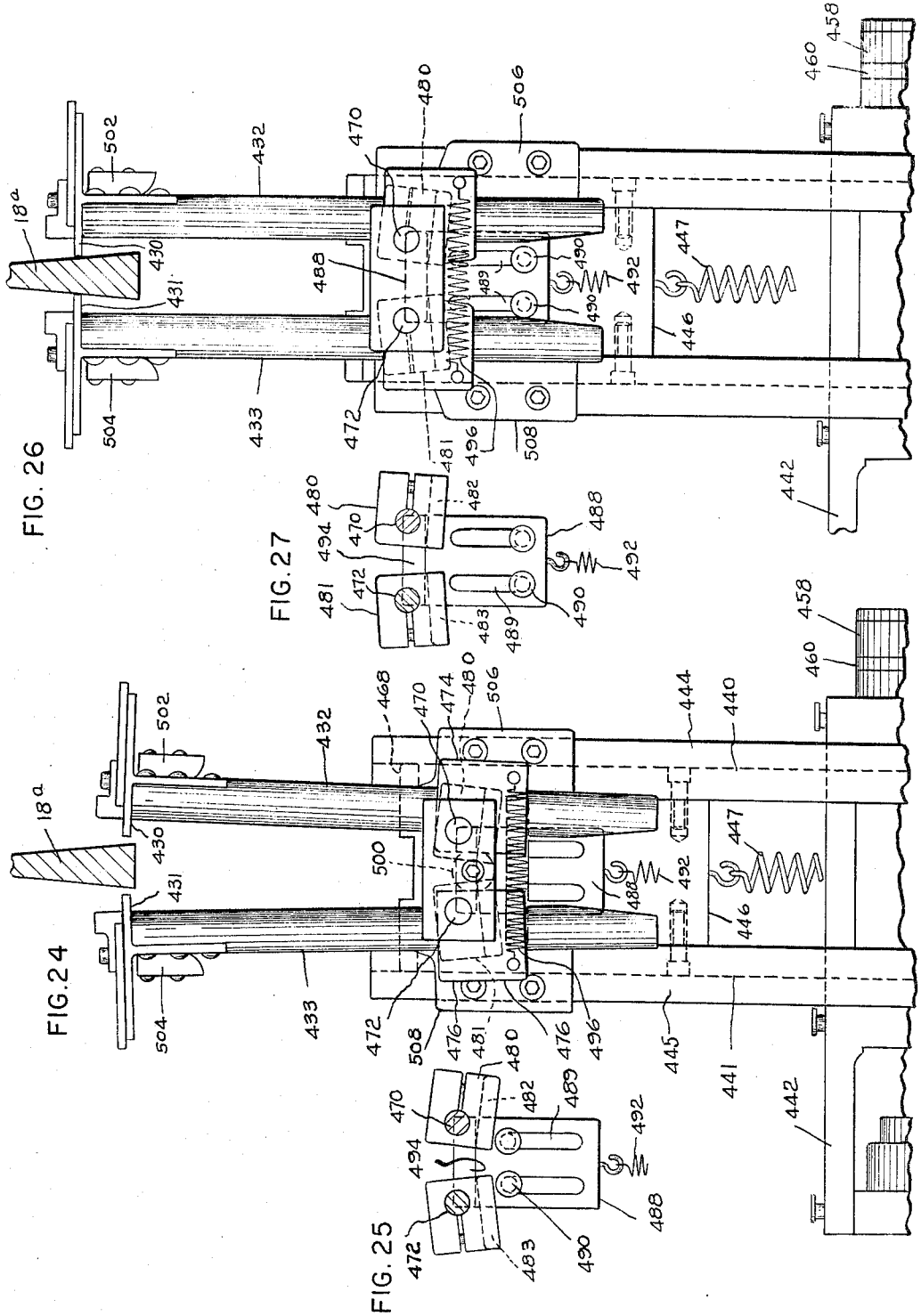

Nov. 8, 1966  J. H. THORP  3,284,570

CASING-IN MACHINE INCLUDING PLURAL COATING MEANS

Filed Dec. 5, 1961  14 Sheets-Sheet 12

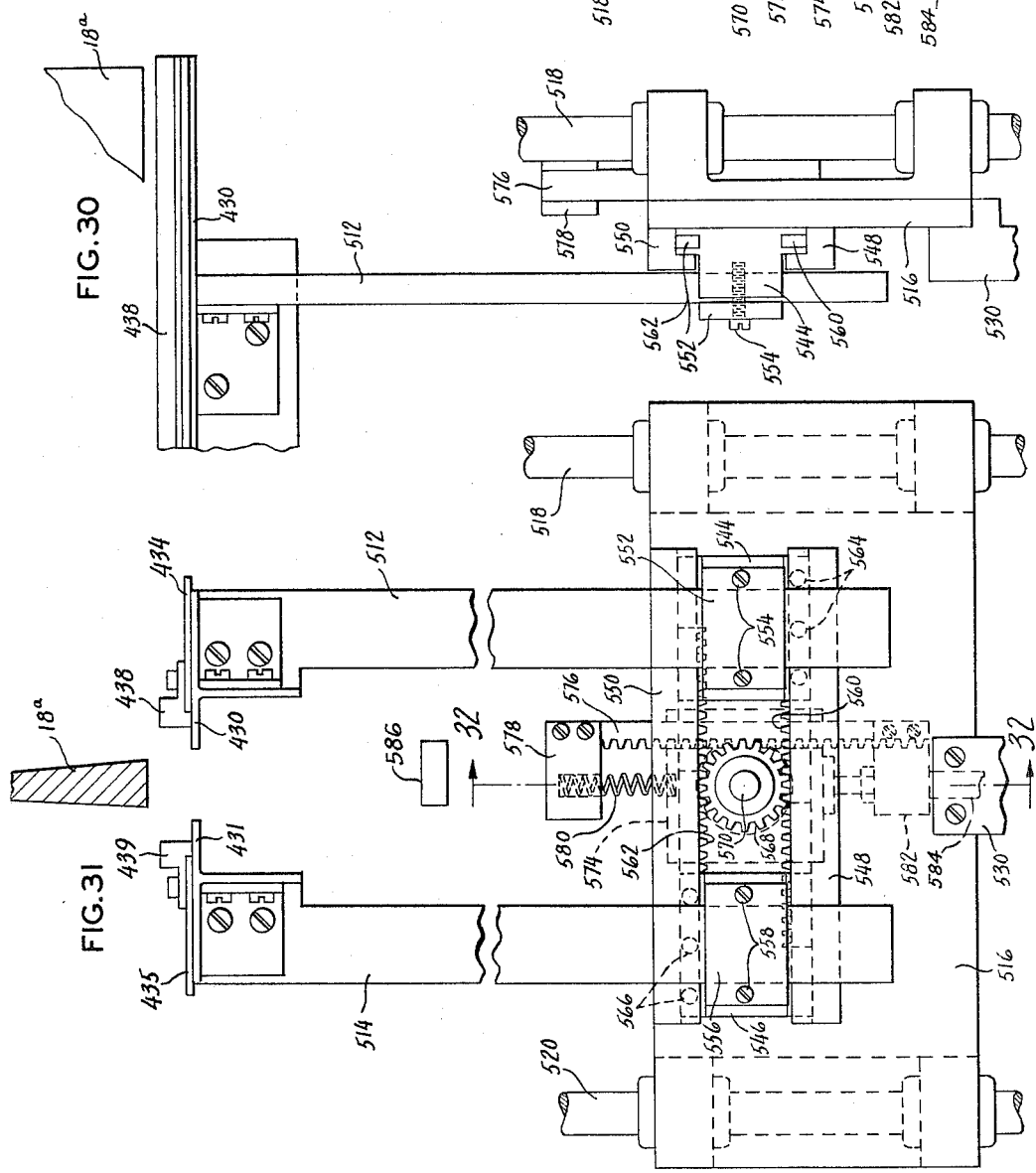

Nov. 8, 1966 J. H. THORP 3,284,570
CASING-IN MACHINE INCLUDING PLURAL COATING MEANS
Filed Dec. 5, 1961 14 Sheets-Sheet 14
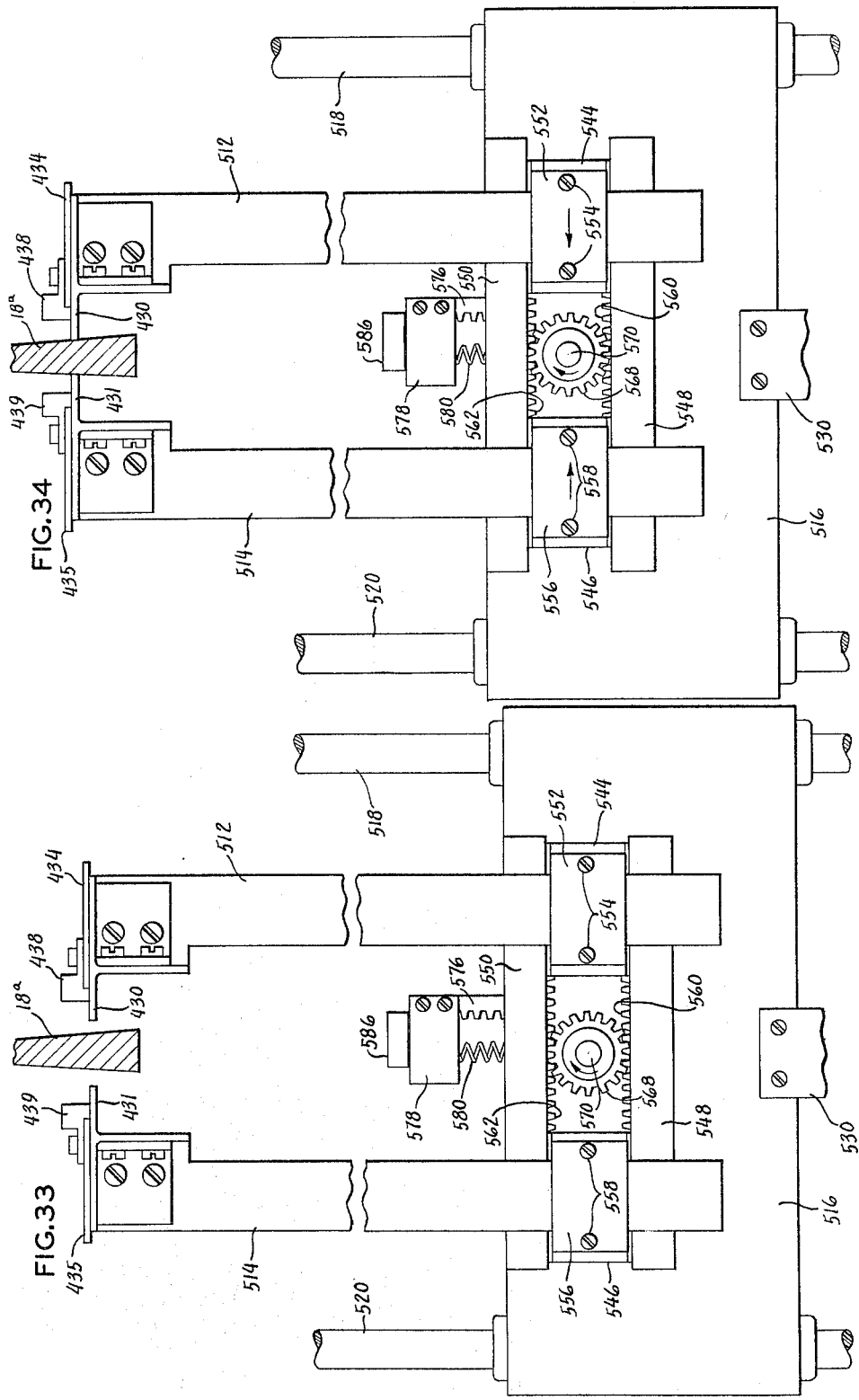

United States Patent Office 3,284,570
Patented Nov. 8, 1966

3,284,570
CASING-IN MACHINE INCLUDING PLURAL COATING MEANS
James H. Thorp, Hartford, Conn., assignor to The Smyth Manufacturing Company, Bloomfield, Conn., a corporation of Connecticut
Filed Dec. 5, 1961, Ser. No. 157,109
23 Claims. (Cl. 118—224)

Apparatus embodying the invention is particularly adapted for use with a cyclically operable book casing-in machine of the type wherein there are vertical or upright saddle plates arranged about a central axis, the plates turning each cycle being indexed about said axis so that said plates are moved successively to a filler receiving station. Also during each cycle the plates are moved vertically.

The general object of the invention is to provide an apparatus operable in timed relationship with the casing-in machine for feeding book fillers to saddle plates of the machine as they arrive successively at said receiving station.

A more specific object of the invention is to provide an apparatus of the type described having a filler supporting means that is movable during each cycle into and out of a position for guiding the books onto the saddle plates of the casing-in machine.

Another more specific object of the invention is to provide an apparatus of the type described having means for applying adhesive to the fillers during each cycle prior to feeding them onto the saddle plates of the casing-in machine.

Further objects of the invention are to provide various features of construction and arrangement whereby the before stated objects are attained.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 6 is a fragmentary transverse sectional view taken along the lines 6—6 of FIGS. 3 and 7.

FIG. 7 is a rear view of the mechanism shown in FIG. 6.

FIG. 8 is an enlarged view showing the guide rolls, this being a sectional view taken along the line 8—8 of FIG. 3, but with the parts differently adjusted.

FIG. 9 is a transverse sectional view taken along the line 9—9 of FIG. 3, but showing only the upper portion of the apparatus.

FIG. 10 is a fragmentary enlarged plan view taken in the direction of the arrows 10, 10 in FIG. 9.

FIG. 11 is a transverse sectional view taken along the lines 11—11 of FIGS. 2A and 3, but showing only the upper rear portion of the apparatus.

FIG. 12 is a fragmentary sectional view taken along the line 12—12 of FIG. 11.

FIG. 13 is a fragmentary sectional view taken along the line 13—13 of FIGS. 3 and 11.

FIG. 16 is a fragmentary plan view taken in the direction of the arrows 16, 16 in FIG. 14a.

FIG. 17 is an enlarged fragmentary side view of the extreme left portion of the apparatus, the supporting plates being in their lower separated positions.

FIG. 18 is a left end view of the parts shown in FIG. 17.

FIG. 21 is a horizontal sectional view taken along the line 21—21 of FIG. 18.

FIG. 22 is a vertical sectional view taken along the line 22—22 of FIG. 21.

FIG. 23 is a fragmentary vertical sectional view taken along the line 23—23 of FIG. 17.

FIG. 24 is a view generally similar to the upper portion of FIG. 18, but showing the supporting plates in intermediate positions above those shown in FIG. 18.

FIG. 25 is a fragmentary view generally similar to FIG. 23, but showing the parts in positions corresponding to the positions shown in FIG. 24.

FIG. 26 is a view similar to FIG. 24 but showing the supporting plates in their uppermost positions.

FIG. 27 is a view similar to FIG. 25 but showing the parts in positions corresponding to the positions shown in FIG. 26.

FIG. 30 is an enlarged fragmentary side view of some of the parts shown in FIG. 28.

FIG. 31 is a left end view of the parts shown in FIG. 30.

FIG. 32 is a fragmentary vertical sectional view taken along the line 32—32 of FIG. 31.

FIG. 33 is a view similar to FIG. 31, but showing the movable parts moved upwardly to intermediate positions.

FIG. 34 is a view similar to FIG. 33, but showing the movable parts in their final operative positions.

Figure 1:
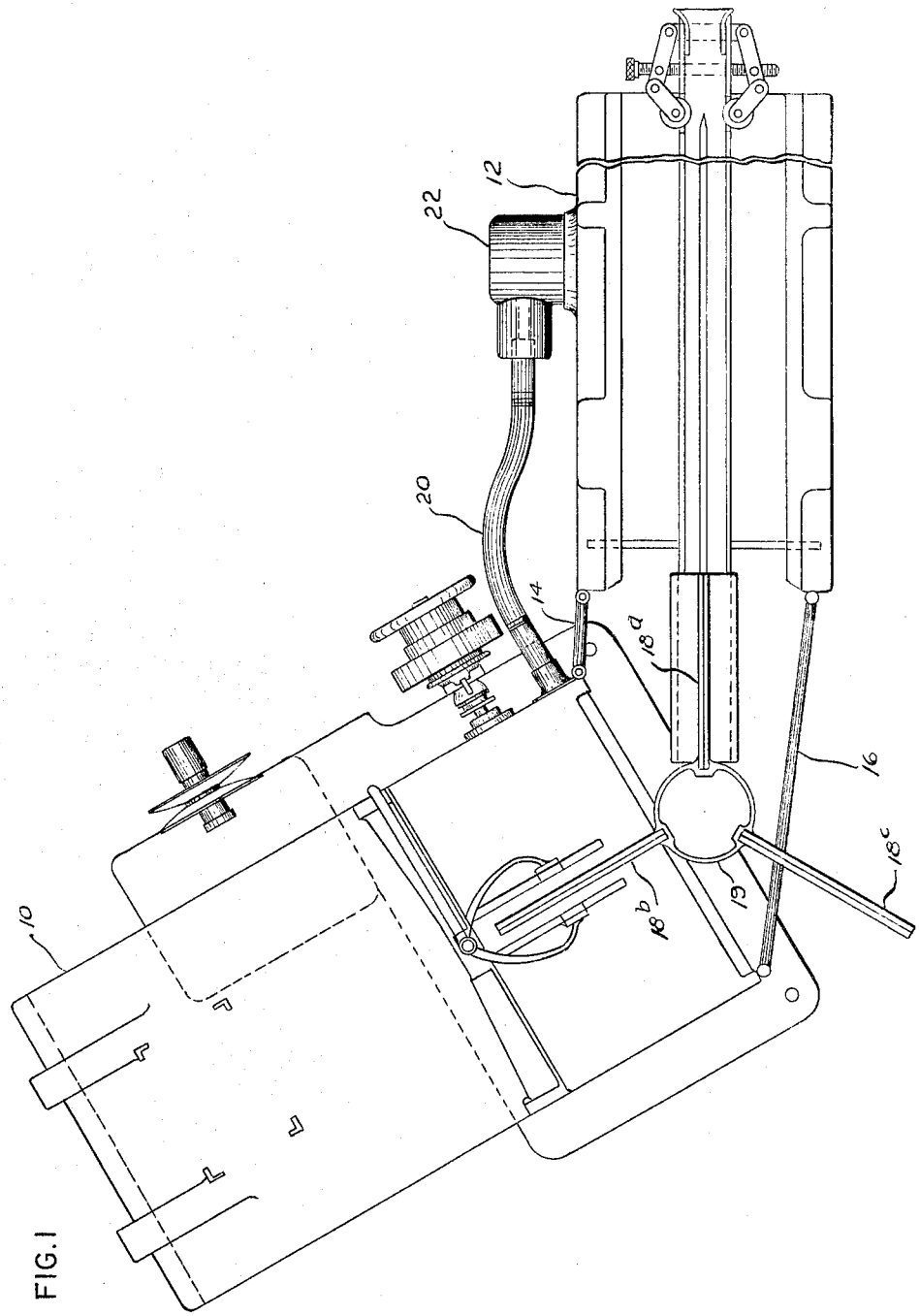
FIG. 1 is a schematic plan view of an apparatus embodying the invention and of a casing-in machine with which the apparatus is particularly adapted to be used.
Figure 2:
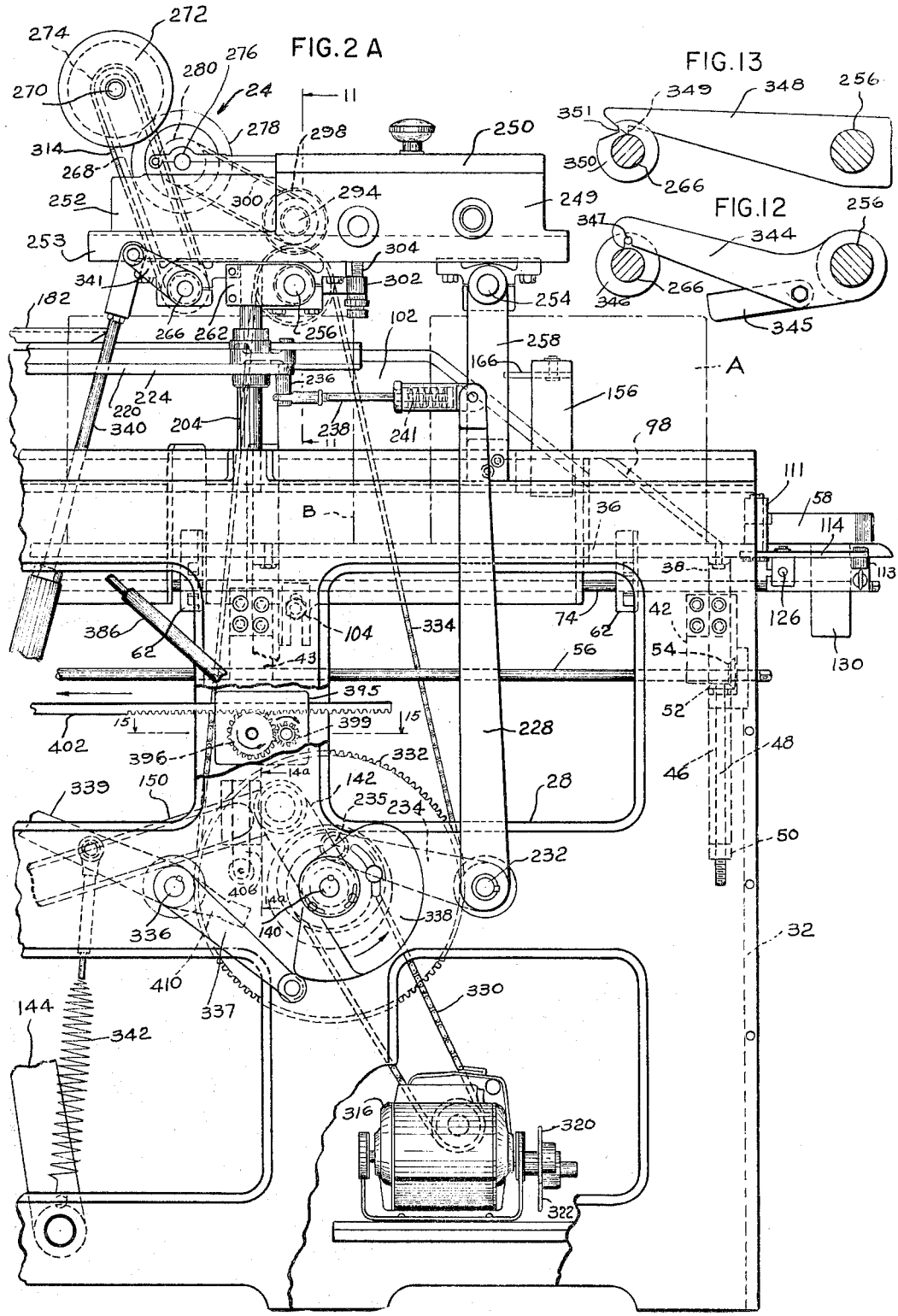
FIG. 2A is a front view of the right portion of an apparatus embodying the invention.
FIG. 2B is a front view of the left portion of the apparatus.

*The apparatus of the invention in relation to a casing-in machine FIGS. 1, 2A and 2B*

Referring to the drawings and particularly to FIG. 1 thereof, a cyclically operable casing-in machine 10 is shown at the left and a cyclically operable feeding apparatus 12 embodying the invention is shown at the right. The apparatus 12 is preferably adapted for applying adhesive to the fillers in addition to feeding them. Preferably connecting means such as the rods 14 and 16 are provided for holding the machine 10 and the apparatus 12 in proper relationship.

The casing-in machine 10 is of a well known type, and it comprises a plurality of vertical or upright saddle plates which are uniformly spaced about a vertical axis. Ordinarily there are three plates as shown, the positions of these plates being designated at 18a, 18b, 18c. The plates are carried by a central mast 19, and the several saddle plates are also vertically reciprocated relatively to the mast and at least one of them being so reciprocated during each cycle. The vertical reciprocation of the plates is necessary for casing-in purposes but this has no relation to the present invention. Said mast and saddle plates are indexed during each cycle through an angle corresponding to the blade spacing, and in the machine as shown each indexing is through an angle of 120°. After indexing, one saddle plate is in its uppermost position and at a receiving station at the right as indicated at 18a in FIGS. 1, 2B and 4.

The feeding and adhesive applying apparatus 12 is adapted at the right end thereof to successively receive book fillers in vertical positions with their backs facing upwardly. The apparatus 12 serves to move the fillers successively toward the left and to feed them onto the saddle plate of the casing-in machine, and the apparatus 12 preferably applies adhesive to the fillers.

In order that the casing-in machine and feeding apparatus may opearte in synchronism, power for operating the feeding and adhesive applying apparatus is transmitted from the casing-in machine 10 by means of a flexible shaft 20. The flexible shaft 20 is connected with a gear box 22 on the feeding and gluing apparatus 12, and power is transmitted from the gear box to the main drive shaft of the apparatus.

Referring more particularly to FIGS. 2A and 2B, it is pointed out that the apparatus for feeding and for gluing has a horizontal longitudinal support and guide rail onto the right end of which the book fillers are placed, manually or otherwise. The fillers are in vertical positions with their backs facing upwardly, and they are automatically moved along the rail toward the left. As the fillers are so moved, adhesive is applied to their backs by a mechanism 24, and adhesive is applied to the upper portions of their sides by a mechanism 26. The main frame of the feeding and gluing machine comprises generally similar upright front and rear plates 28 and 30 and generally similar upright right and left end plates 32 and 34. The front and rear plates 28 and 30 are shown as castings having openings therein. These several plates support the gluing mechanisms 24 and 26 and they support the guide rail and various other parts of the machine.

The invention is not limited as to the type of adhesive, but ordinarily glue is applied by the mechanism 24. Glue may be also supplied by the mechanism 26, but frequently paste is preferable. For convenience of description, but without any limitation, both mechanisms will be referred to as adapted to apply glue.

*Supporting and guiding devices for book fillers FIGS. 2A, 2B, and 3 to 8*

Figure 3:
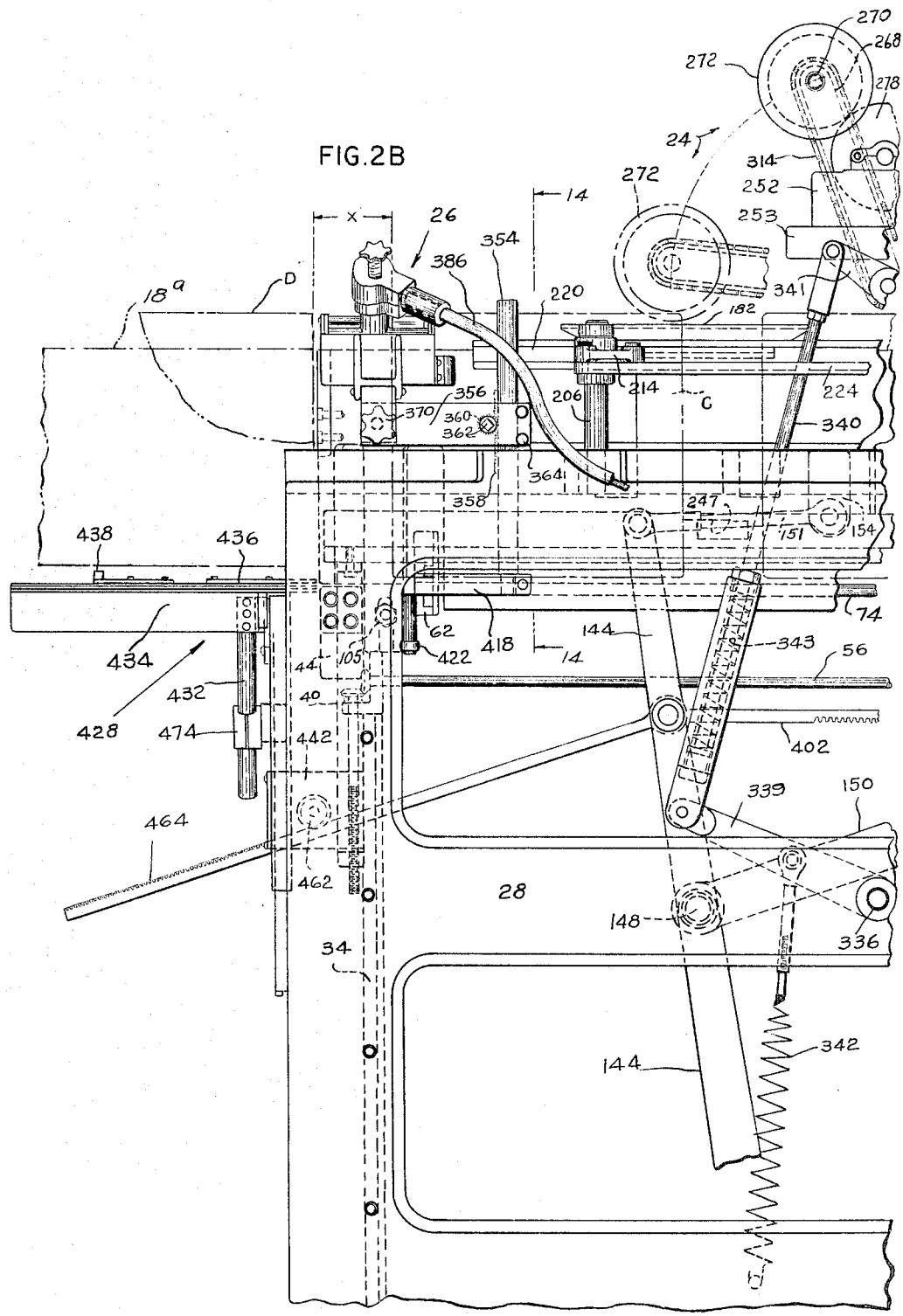
FIG. 3 is a plan view of the apparatus.
Figure 4:
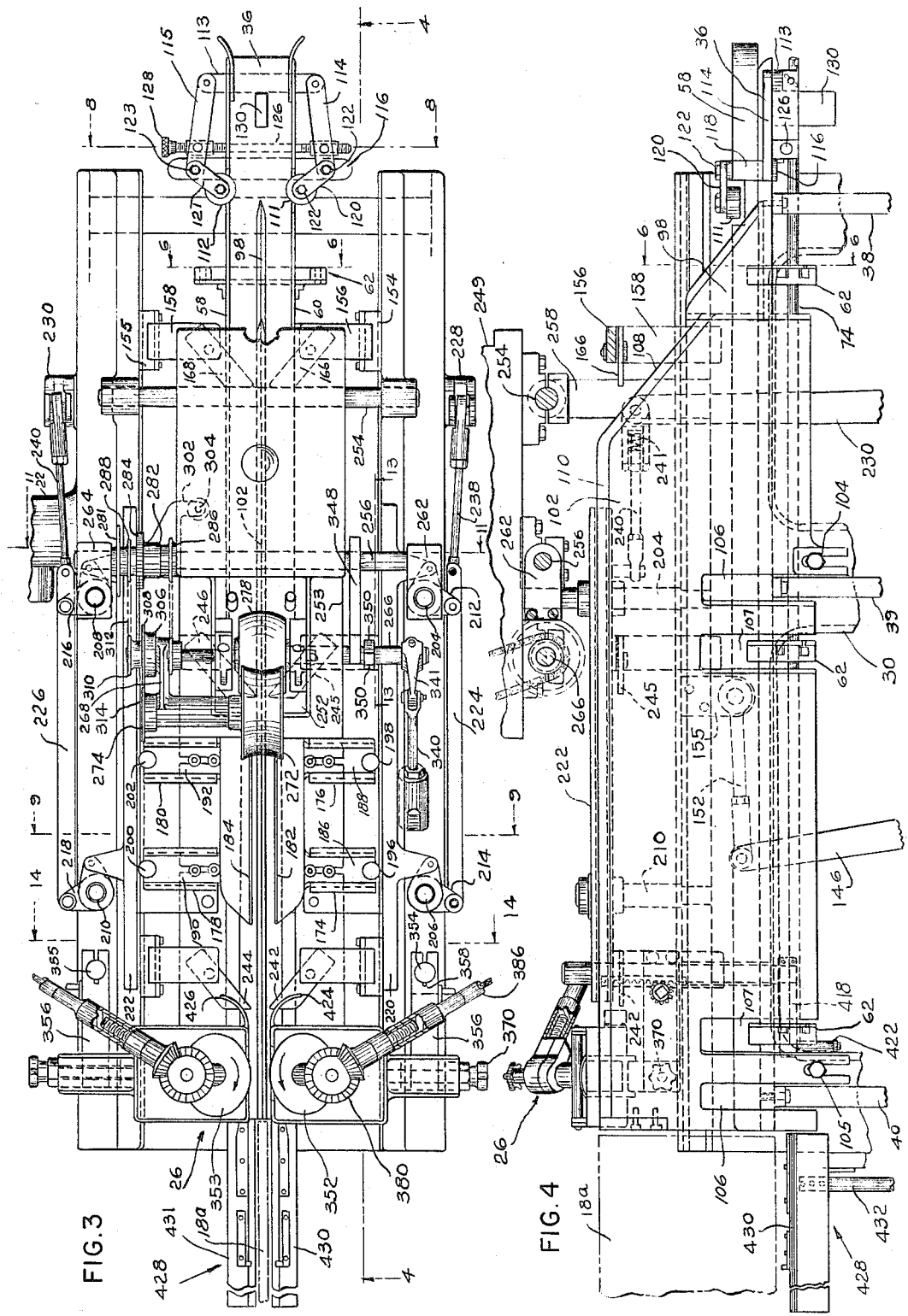
FIG. 4 is a vertical sectional view of the upper portion of the apparatus, this view being taken generally along the line 4—4 of FIG. 3 but with some parts omitted.
Figure 5:
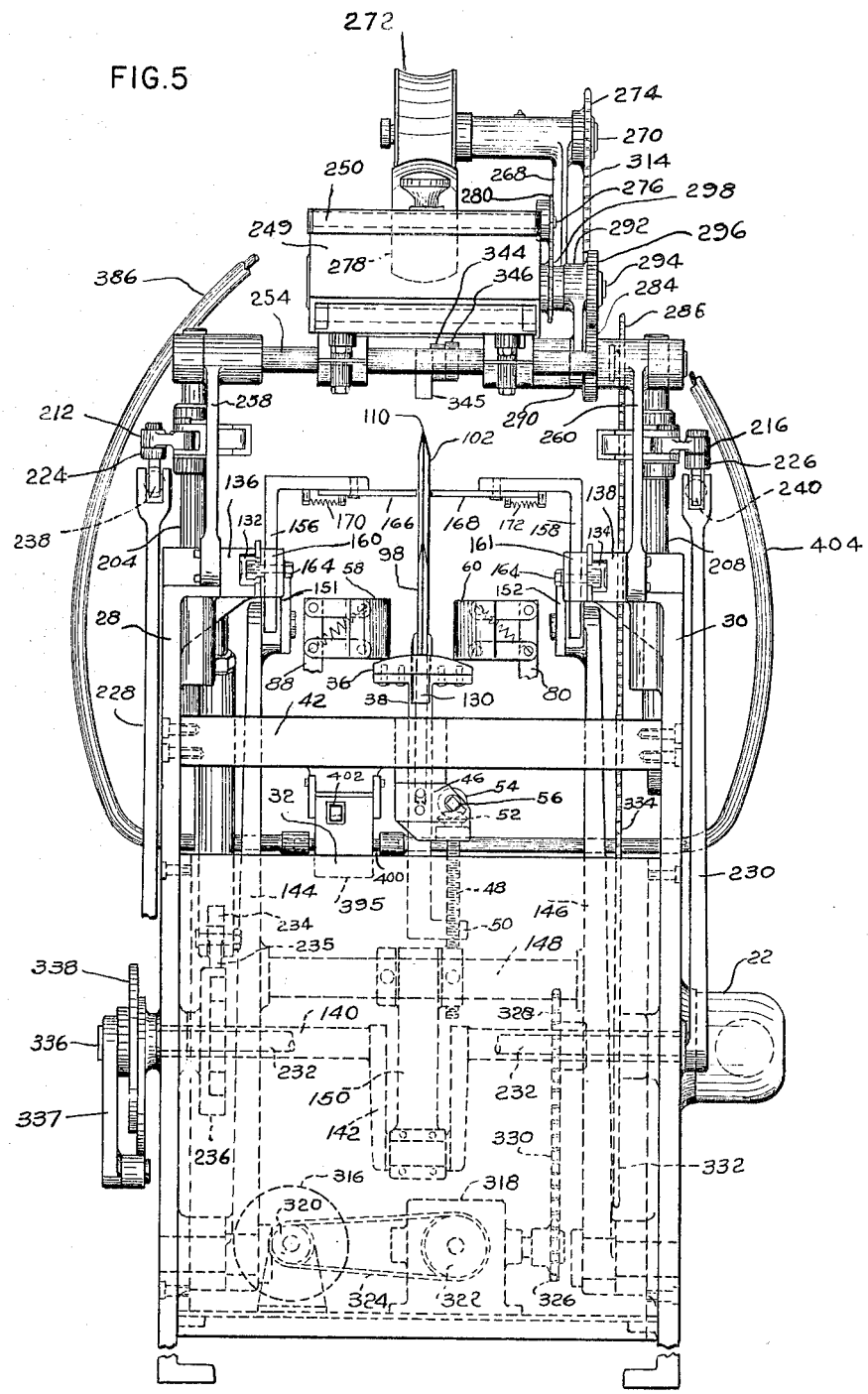
FIG. 5 is a reduced right end view of the apparatus, the guide rolls and associated parts at the right being omitted.

Referring particularly to FIGS. 3, 4 and 5, the before mentioned longitudinal supporting rail is shown at 36. The rail 36 is adapted to be positioned in longitudinal register with a saddle plate of the casing-in machine at said receiving station thereof, and FIG. 1 shows it so positioned. The upper face of the rail 36 is convex in transverse section. As shown, the rail is supported by three similar upright members 38, 39 and 40 which are carried respectively by crossbars 42, 43 and 44 extending between the front and rear plates 28 and 30.

The supporting rail 36 is preferably adjustable vertically for books of different widths, and for this purpose the upright members 38, 39 and 40 are vertically adjustable relatively to the crossbars 42, 43 and 44. Three similar mechanisms are provided for adjusting the upright members in unison, and the mechanism at the front will be described. Connected with the crossbar 42 is a bracket 46 having a bearing near its upper end for a vertical screw 48. The lower portion of the upright member 38 has a projection 50 into which the screw 48 is threaded. Secured to the upper end of the screw 48 is a bevel gear 52 which meshes with a bevel gear 54 on a longitudinal shaft 56. Adjusting mechanisms, similar to that described, are provided for the central upright member 39 and for the left upright member 40. All three mechanisms are operated by the same shaft 56. The shaft is manually rotatable to raise or lower the rail 36 as required.

For guiding the successive book fillers at the sides thereof, two longitudinal guide rails 58 and 60 are provided which are equally spaced from the center of the supporting rail 36. The guide rails have their right or entrance ends curved away from the central plane to facilitate the placing of book fillers between said rails. The guide rails 58 and 60 are adjustable transversely of the supporting rail for books of different thickness and for this purpose two or more similar mechanisms 62, 62 are provided, three mechanisms being shown. One of the said mechanisms is more fully shown in FIGS. 6 and 7 and the mechanism as so shown will be described.

Secured to the bottom of the supporting rail 36 and at opposite sides of the center line thereof are front and rear brackets 64 and 66. The brackets are provided in their rear faces with transverse guide grooves for upper and lower transversely movable racks 68 and 70. The bracket 66 is provided with a recess for a spur gear 72 which meshes with said racks and which is keyed to a longitudinal shaft 74. Plates 76 and 78 at the faces of the brackets 64 and 66 close the guide grooves and the recess to hold the racks 68, 70 and the gear 72 in place.

A bracket 80 is carried by the lower rack 70 at the rear portion thereof, the bracket being notched to receive the rack as clearly shown in FIG. 7. The bracket 80 has a transverse groove 82 which provides clearance for the upper rack 68. The rear guide rail 60 is connected with the bracket 80 by parallel motion links 84, 84 which hold the rail in upright position while permitting it to move vertically. The rail 60 tends to move downwardly by gravity to the extent permitted by the rail 36. Preferably a tension spring 86 additionally biases the rail 60 for downward movement. A bracket 88, generally similar to the bracket 80, is carried by the upper rack 68 at the front portion thereof, the bracket being notched to receive the rack. The front guide rail 58 is connected with the bracket 88 by parallel motion links 90, 90 similar to the links 84, 84. There is a spring 92 similar to the spring 86 for biasing the rail 58 for downward movement. A pin 94 limits rearward movement of the lower rack 70, and a pin 96 limits forward movement of the upper rack 68.

All of the adjusting mechanisms 62, 62 are operated by the same shaft 74 which can be turned manually. The guide rails 58 and 60 can be moved in unison toward or away from the center line of the supporting rail 36, and the parallel motion links 84, 84 and 90, 90 enable the rails to remain in engagement with the curved upper face of the rail 36 as they are so moved. The rails are adjusted in accordance with the thickness of the fillers, but they do not closely confine said fillers.

Secured to the top of the rail 36 at a transversely central position and spaced toward the left from the filler receiving end of said rail is a thin vertical blade 98. The blade has a sharp edge which faces upwardly and toward the right at an angle of approximately 45°. The height of the blade 98 is substantially less than the height of the narrowest fillers for which the machine is adapted. As each filler is moved along the rail 36 toward the left, the filler is centrally split by the blade 98 which enters between two leaves of the filler.

A thin vertical longitudinal supporting blade 102 is provided which extends upwardly from the rail 36 at the center thereof. Preferably the rail 36 has a long central vertical slot at the left of the blade 98 and the blade 102 extends through the slot and is supported independently of the rail, and as shown said blade 102 is provided with vertical slots in which screws 104, 105 are entered. The screws 104, 105 engage brackets on the cross-bars 43 and 44. By loosening and retightening the screws 104, 105, the blade 102 may be vertically adjusted within relatively narrow limits. As shown in FIG. 4, slots 106 and 107 are provided in the lower portion of the blade 102 to provide clearances for the mechanisms that provide vertical adjustment for the main rail 36 and for the mechanisms 62, 62 that provide adjustment for the guide rails 58 and 60. The blade 102 has a sharp inclined edge 108 which faces upwardly and toward the right. Ordinarily the lower right end of the edge 108 is below the top of the blade 98. The blade 102 has a sharp horizontal top edge 110 and the height of the blade is such that its top edge 110 is considerably higher than the top edge of the blade 98. Preferably the blade 98 is provided at its left edge with a vertical V-shaped groove and the blade 102 is provided at its right edge with a beveled portion that fits the groove in the blade 98.

As each filler is moved along the rail toward the left, it is first split by the blade 98 and it is then moved onto the blade 102. The filler remains in engagement with the rail 36 and the blade 102 serves to hold the upper portion of the filler at a position close to the point of glue application by the mechanism 24. The rail 36 and the blade 98 are adjusted vertically in accordance with the filler width, but the blade 102 is ordinarily not adjusted and its upper edge remains in a predetermined relationship with said glue mechanism 24.

The spacing between the guide rails 58 and 60 is adjusted to be slightly greater than the thickness of the fillers, this being necessary to permit the fillers to be expanded by the blades 98 and 102. It is desirable, however, for each filler to be so guided that it cannot be unduly expanded before it reaches the blade 98. Locating rolls 111, 112 are therefore provided for this purpose adjacent the entrance ends of the guide rails, said rolls preferably being adjustable so that the spacing between them is approximately the same as the thickness of the filler. The rolls 111, 112 are transversely spaced approximately equally from the center of the supporting rail 36.

A suitable mechanism for supporting and adjusting the rolls 111, 112 is shown and this will be described, this being best shown in FIGS. 3, 4 and 8. Secured to the bottom of the rail at the right end thereof is a transverse bar 113. Pivoted to the bar are two arms 114, 115 that extend generally toward the left and are supported by a transverse bar 116 secured to the rail 36. The arms 114, 115 carry upright posts 118, 119 to the upper ends of which arms 120, 121 are secured by screws 122, 123. The last said arms are inclined toward each other and they carry said rolls 111, 112. The positions of the arms 120, 121 with respect to the posts 118, 119 can be changed by loosening the screws 122, 123 and then tightening them. Nuts 124, 125 are pivoted to the arms 114, 115 and a manually rotatable screw 126 has threaded engagement with the nuts. It is provided at one end with a knob 128. The two nut engaging portions of the screw 126 are oppositely threaded so that rotation of the screw serves to move the arms 114, 115 and their associated parts toward and away from each other. The rolls 111, 112 are adapted to engage the book fillers near the tops of the guide rails 58 and 60, and as shown the rails are notched to receive the rolls.

Preferably the rail 36 is provided near its right end with a vertical opening for receiving a block 130 of paraffin or the like for lubricating the bottoms of the fillers as they are initially moved along the rail.

*Mechanism for longitudinally moving the fillers, FIGS. 2A, 2B, 3 to 6, 9 and 10*

The mechanism for longitudinally moving the book fillers includes a series of longitudinally reciprocable pushers, 166, 168 and 245, 246 and 242, 244, all of which are shown in FIG. 3. The pushers of the several pairs are adapted for engaging the fillers at the trailing ends thereof. The longitudinal distance between each pair of pushers and the next following pair of pushers is less than the extent of slide reciprocation.

For supporting and actuating the pushers, two slides 132 and 134 are preferably provided which are located at opposite sides of the rail 36 and are reciprocable in unison during each cycle. As shown, the slides 132 and 134 are longitudinally movable in guideways in inwardly projecting blocks 136 and 138 carried by the front and rear plates 28 and 30. The slides are held in place by suitable gibs. Carried by the slides 132 and 134 are devices which are engageable with the fillers on the supporting rail 36 for feeding them rearwardly and toward said casing-in machine and successively to a plurality of stations uniformly spaced along the rail. The last of the said stations coincides with the receiving station of said machine 10.

For moving the slides 132 and 134, and for moving other parts as hereinafter described, there is provided a transverse crankshaft 140 driven by the flexible shaft 20 and by gears in the box 22. The shaft 140 makes one rotation in the counterclockwise direction during each cycle of the casing-in machine 10. The shaft 140 is supported by suitable bearings in the front and rear plates 28 and 30 and it has a central crank portion 142. Similar levers 144 and 146 are pivoted for oscillating movement about a horizontal transverse axis near the bottom of the machine, and these levers are connected with each other by a cross rod 148. The cross rod 148 is connected by a pitman rod 150 with the crank portion 142 of the shaft 140. Thus the levers 144 and 146 make one complete oscillation during each cycle. Links 151 and 152 connect the levers 144 and 146 with blocks 154 and 155 (FIGS. 2B and 4) on the respective slides 132, 134. The described mechanism reciprocates the slides so that they make one complete reciprocation during each cycle, the length of the reciprocation being substantially greater than the length of the longest book fillers for which the apparatus is adapted.

Referring particularly to FIG. 5, the pushers 166 and 168 are carried by brackets 156 and 158 which are secured to the slides 132 and 134 near the right ends thereof. Blocks 160 and 161 are secured to the slides, and the brackets are vertically adjustable relatively to the blocks 160 and 161 and they are held in positions by bolts 164, 164. The brackets have inwardly projecting portions to which said pushers 166 and 168 are pivoted. Springs 170 and 172 are provided for biasing the pushers to the positions shown in FIGS. 3 and 5.

The pushers 245, 246 and the pushers 242, 244 are connected with the slides 132, 134 by devices similar to those described. The brackets for supporting the pushers 242, 244 are shown at 245 and 246 in FIG. 9.

As the pushers 166, 168 move longitudinally toward the left, the operator places a book filler between the guide rails 58, 60 and between the rolls 111, 112 and in engagement with the blade 98 and perhaps also the blade 102 to effect the splitting of the filler. The filler is so placed at the "1st position" as shown by dotted lines at A in FIG. 2A, or somewhat toward the right from said position. As the pushers move toward the right they swing in opposition to the springs 170, 172 so as to pass the filler previously placed in said 1st position. Then the pushers swing into positions at the right of the filler and as they move toward the left they move the filler toward the left to a definitely predetermined "2nd position" as shown at B in FIGS. 2A and 2B. During the next following reciprocation of the slides 132, 134, the filler is engaged by the pushers 245, 246 and is moved from the 2nd position shown at B to the 3rd position shown at C in FIG. 2B. During the reciprocation of the slides 132, 134 next following that above mentioned, the filler is engaged by the pushers 242, 244 and is moved from the 3rd position to the 4th position shown at D in FIG. 2B.

During the operation of the apparatus, book fillers are successively placed as previously described in the "1st position" and they automatically move by the pushers 166, 168 and by the pushers 245, 246 and by the pushers 242, 244 to the described 2nd, 3rd and 4th positions. The several parts that effect the movement of the filler to the several positions are operated by the main shaft 140 which is driven from the casing-in machine by means of the flexible shaft 20. Each filler is moved from one position to the next during one cycle of the action of the casing-in machine.

*First glue applying mechanism*

The first glue applying mechanism 24 includes a glue reservoir 249 above the path of filler movement. The reservoir has a main rectangular portion at the right which is enclosed by a removable cover 250 and it has a narrower portion 252 at the left on a platform 253 integral with the main reservoir. Glue in the reservoir will maintain a uniform level in the main reservoir and in the narrower left portion 252. The reservoir is carried by two transverse horizontal rods 254 and 256. The right rod 254 is supported by two uprights 258 and 260 connected respectively with the blocks 136 and 138 carried by the front and rear plates 28 and 30. The left rod 256 is supported by blocks 262 and 264 carried respectively by the posts 204 and 208. The blocks 262 and 264 are vertically adjustable along the posts so that the reservoir may be tilted upwardly or downwardly about the axis of the rod 254. The reservoir is shown as being level, but it is ordinarily tilted downwardly toward the left to insure flow of glue into the narrower left portion 252. A suitable means, not shown, is provided for maintaining the glue in the reservoir at a proper temperature.

Supported by the reservoir platform 253 near the center thereof is a transverse rockshaft 266. Secured to the shaft 266 near the rear end thereof is an arm 268 having at its projecting end a bearing for a transverse shaft 270. A glue applying roller 272 is secured to the shaft 270 at the front end thereof and a sprocket wheel 274 is secured to the shaft 270 at the rear end thereof. Supported above the narrower portion 252 of the reservoir is a transverse rotatable shaft 276. A glue transfer roller 278 is secured to the shaft 276 in position to dip into glue in the reservoir and a sprocket wheel 280 is secured to the shaft at the rear end thereof.

Rotatable on the rod 256 near the rear end thereof is a hub 282 carrying a gear 284 and two sprocket wheels 286 and 288. These parts are best shown in FIGS. 3, 5 and 11. Also carried by the rod 256 is a hub 290 having an arm which extends upwardly and carries a bearing 292 for a stub shaft 294. Secured to the shaft 294 is a gear 296 which meshes with the gear 284. Also secured to the shaft 294 is a sprocket wheel 298 in alignment with the sprocket wheel 280 on the shaft 276. A chain 300 passes around the sprocket wheels 298 and 280. For tightening the chain 300 the hub 290 is provided with an arm 302 which extends underneath the main body of the reservoir. A screw 304 in the arm 302 engages the reservoir, and when the screw is turned the hub 282 is rocked clockwise to tighten the chain.

Rotatable on the rear portion of the rockshaft 266 is a hub 306 carrying two sprocket wheels 308 and 310. The sprocket wheel 310 aligns with the sprocket wheel 288 on the hub 282 and a chain 312 passes around the last said wheels. The sprocket wheel 308 aligns with the sprocket wheel 288 on the shaft 270 and a chain 314 passes around the last said wheels.

For rotating the hub 282 and the parts connected therewith there is provided a motor 316 which drives gears in a gear box 318 by means of sprocket wheels 320 and 322 and a chain 324. The driven shaft of the gear box carries a sprocket wheel 326 which aligns with a sprocket wheel 328 freely rotatable on the main shaft 140. A chain 330 passes around the last said wheels. The sprocket wheel 328 is connected with a sprocket wheel 332 which aligns with the sprocket wheel 286 on the hub 282. A chain 334 passes around the last said wheels.

Referring to FIGS. 2A, 2B and 5, a transverse rockshaft 336 is provided at about the same level as the main shaft 140 and spaced therefrom toward the left. Connected with the rockshaft 336 at the front thereof is an arm 337 carrying a roller which engages a cam 338 on the shaft 140. Also secured to the rockshaft 336 is an arm 339. The arm 339 is connected by a link 340 with an arm 341 on the rockshaft 266. A coil tension spring 342 tends to move the arms 337 and 339 counterclockwise and this tends to hold the roller in engagement with the cam 338. The cam 338 preferably comprises two angularly adjustable parts so that the cam may be effective through different extents of rotation. Included in the link 340 is a compressible coil spring 343 which permits the continued oscillation of the arm 339 even though oscillation of the rockshaft 336 and of the arm 341 is prevented as hereinafter explained.

The motor 316 is provided solely for driving certain parts of the first glue applying mechanism, the motor and the said parts driven thereby being operated continuously and without regard to the cyclic action of other parts of the machine. By means of the chains 330 and 334 together with their associated parts, the hub 282 on the transverse rod 256 is continuously rotated and this serves by means of the gears 284 and 296 to rotate the stub shaft 294. The glue applying roller 272 is continuously driven from the hub 282 by means of the chains 312 and 314 and their associated parts. The glue transfer roller 278 is driven from the stub shaft 294 by means of the chains 300 and 314 and their associated parts.

With the parts in the positions shown in FIGS. 2A and 2B, the glue applying roller 272 is in engagement with the glue transfer roller 278. The last said roller dips into the liquid glue in the reservoir and transfers the glue to the roller 272 so that the latter has a coating of glue throughout its entire periphery. The cam 338 is so positioned and shaped that the arm 337 is released at the proper time so as to permit the arm 339 to be moved downwardly by the spring 342. As the arm 339 is so moved, the glue applying roller 272 is moved from the position shown by full lines in FIGS. 2A and 2B to the position shown by dotted lines in FIG. 2B. In the last said position the roller 272 is adapted to transfer the glue from its peripheral surface onto the back of a book filler. Preferably the glue applying roller 272 is made from a soft pliable material so that it will conform to any inequalities in the surface of the back of the filler.

The timing is such that the roller 272 is moved to its glue applying position at or about the time that the book filler is being first moved toward the left arm from the 2nd position to the 3rd position. After the filler has passed the roller 272, the cam 338 engages the roller on the arm 337 to move the several parts and restore the roller to the position shown by full lines in FIG. 2B where it again receives a coating of glue. The cam 338 can be adjusted to maintain the roller 272 in its lower position for longer or shorter times in accordance with the length of the fillers.

Preferably the timing is such that the roller 272 is moved into its engaging position shortly after the leading end of the filler has passed the roller, and the roller is withdrawn shortly before the trailing end of the filler reaches the roller. This leaves small unglued areas at the ends of the filler so as to avoid any possible overflow of excess glue onto the vertical end faces of the filler.

It is preferred to maintain the roller 272 in its upper position when there is a failure to maintain a continuous sequence of book fillers. In the event that there is no filler at the 2nd position B to be moved to the 3rd position C, the roller remains in its upper position. But when there is a filler at the second position, the filler releases the roller for downward movement as previously described.

Referring particularly to FIGS. 11 and 12, an arm 344 is loosely mounted on the rod 256, extending toward the left therefrom. An arm 345 is fixedly connected with the arm 344 for movement in unison therewith. The arm 345 is so located that it is adapted to be engaged and lifted by a book filler in the 2nd position. A collar 346 is fixed to the shaft 266, this collar having a transversely projecting pin 347. The arm 344 has a notch which receives the pin 347 when the parts are in the positions shown in FIG. 12. In this position the rockshaft 266 is held against rotative movement and the roller 272 is held in its upper position. The locking of the rockshaft 266 prevents oscillation of the arm 341 and prevents reciprocation of the upper part of the link 340. The before-mentioned spring 343 yields to permit continued oscillation of the rockshaft 339. When a filler is in place in the 2nd position at B, the arms 345 and 344 are raised and the pin 347 is freed from the notch in the arm 344. The shaft 266 and the roller 272 are free to move as previously described. However, when no filler reaches the 2nd position the arms 344 and 345 are not raised and the roller 272 remains in its upper position.

It is sometimes desirable to make the gluing device 24 inoperative without completely disconnecting it. For this purpose there is provided a locking device for holding the roller 272 in its upper position as shown in FIG. 2A. The device for this purpose may be widely varied as to details, but one suitable device is shown in FIGS. 3 and 13.

Pivoted on the rod 256 is a latch 348 having a downwardly facing tooth 349. Splined to the rockshaft 266 is a collar 350 having a notch 351 therein. Ordinarily the latch 348 rests on the shaft 266 at one side of the collar 350 as shown in FIG. 3 and it does not interfere with oscillation of the shaft 266. When the action of the gluing device is to be stopped the latch 348 is manually raised and the collar 350 is moved rearwardly to register with the latch and the latch is released to rest upon the collar. Upon the next oscillation of the shaft 266, the tooth 349 drops into the notch 351 and the roller 272 is held in its uppermost position.

*Upper filler guide elements or jaws*

Longitudinal filler guide elements 182 and 184, as shown in FIGS. 2B, 3 and 9, are preferably provided adjacent the first gluing mechanism. These guide elements are located above the level of the top of the supporting blade 102 and they are equally spaced transversely from the central vertical plane of said blade. The guide elements are so spaced that they engage the sides of the successive fillers during action of the said gluing machine.

As shown by dotted lines in FIG. 9, the filler extends to a substantial extent above the blade 102. Without additional support the filler might bend forwardly or rearwardly to such an extent that the glue applying roller 272 would not properly cover the convex upper face of the filler. The guide elements hold the upper portion of the filler in upright position during gluing.

As hereinafter fully explained, means is provided for simultaneously and equally adjusting said guide elements 182, 184 transversely for fillers of different thicknesses.

As shown in the drawings the guide elements 182, 184 are longitudinally movable jaws which constitute a portion of the longitudinally reciprocable filler feeding means. As hereinafter fully explained means is provided for moving said jaws transversely into filler engaging positions prior to each filler feeding action and for thereafter moving said jaws out of said filler engaging positions. The jaws cooperate with the pushers 245, 246 for moving the fillers from the 2nd position to the 3rd position.

As best shown in FIGS. 3 and 9, pairs of brackets 174, 176 and 178, 180 are secured to the slides 132 and 134, being so secured by devices similar to those described for the brackets 156 and 158. The guide elements or jaws 182, 184 are carried by the last said brackets, these jaws being mounted by means of transversely movable slides 186, 188, 190, 192. Transverse adjustments are preferably provided between the jaws and the slides. Springs 194, 195 bias the jaws and the slides away from the central plane of the apparatus. Rollers 196, 198, 200 and 202 are provided on the respective slides 186, 188, 190, 192, these rollers projecting beyond the outer ends of the slides. The jaws 182 and 184 are movable longitudinally with the slides 132 and 134 and they are also movable transversely by mechanism to be described.

Longitudinally spaced posts 204 and 206 project upwardly from rearward projections on the front plate 28 and similar posts 208 and 210 project upwardly from forward projections on the rear plate 30. Rotatably mounted on the posts are bell cranks 212, 214, 216, 218. Two longitudinal cam bars 220 and 222 are provided adjacent the slide rollers 196, 198, 200 and 202, the bar 220 being connected to the bell cranks 212 and 214 and the bar 222 being connected to the bell cranks 216 and 218. The bell cranks 212 and 214 are connected with each other by a longitudinal link 224, and the bell cranks 216 and 218 are connected with each other by a longitudinal link 226.

Two levers 228 and 230 are secured to a transverse rockshaft 232, the levers being respectively at the front and at the rear of the machine. Also secured to the shaft 232 is an arm 234 carrying a roller 235 which engages a cam 236 on the main shaft 140. The upper ends of the levers 228 and 230 are connected with depending pins 236 on the links 224 and 226 by means of links 238 and 240. Each of the links 238 and 240 includes a spring 241 as shown by dotted lines in FIG. 2A.

The cam 236 is so timed and so shaped that the levers 228 and 230 are moved toward the right at or about the time that the slides 132 and 134 and the jaws 182, 184 reach their extreme right positions so as to be engageable with the filler in the said "2nd position" at B. As the levers 228 and 230 are moved toward the right, the links 224 and 226 are similarly moved and the cam bars 220 and 222 are moved inwardly or toward each other. Simultaneously with the last said movements of the cam bars, the slides 132 and 134 start their movement toward the left carrying the jaws 182 and 184 with them. The cam bars in moving inwardly engage the rollers 196, 198, 200, 202 to force the jaws 182, 184 into engagement with the book filler at said 2nd position, said filler being gripped so that the jaws at least assist in moving the filler toward the left to said "3rd position." the cam 236 is further so timed and shaped that the jaws 182 and 184 are separated to release the filler as soon as it reaches said "3rd position." It will be apparent from FIG. 9 that the gripper jaws 182 and 184 engage the fillers above the supporting blade 102. Thus the pressure applied by the jaws is not transmitted to the blade, and the blade does not interfere with the longitudinal movement of the filler.

Preferably a spring pressed stop 247 is provided for positively preventing any possible retrograde movements of the fillers after being engaged by the jaws 182 and 184. The stop is shown in FIGS. 9, 10 and 2B as being carried by one of the guide rails, such as the front rail 58, being pivotally connected to the rail at 248. The stop has a tooth that projects rearwardly through an aperture in said rail. The longitudinal location of the top 247 is shown in FIG. 2B, the stop serving to prevent retrograde movement of the filler from the 3rd position shown at C.

*Second glue (or paste) applying mechanism*
*FIGS. 2B, 3, 4, 14, 15 and 16*

The second glue (or paste) applying mechanism 26 comprises two separate front and rear units respectively having wheels 352 and 353 for applying glue (or paste) to the fillers along narrow zones closely adjacent the back of the filler. The two units are exactly like each other except for reversal of parts, and a detailed description of one unit will suffice for both.

Figure 14:
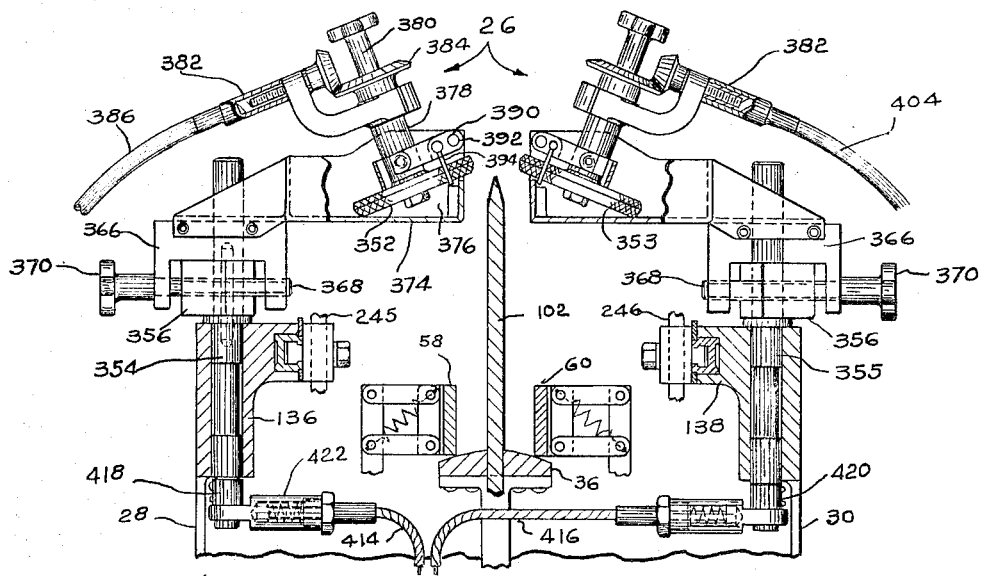
FIG. 14 is a transverse sectional view taken along the lines 14—14 of FIGS. 2B and 3, but showing only the upper portion of the apparatus with certain adjusting mechanisms and other parts omitted.

Referring particularly to FIGS. 2B, 3 and 14, a vertical rockshaft 354 is mounted in a bearing aperture in a projection 136 in the front plate 28. Carried by the shaft 354 is a horizontal arm 356 that extends leftwardly. As shown the arm is vertically movable along the shaft and a key 358 is provided that prevents relative rotative movement. Preferably the key 358 is provided with teeth to constitute a rack, and the arm 356 carries a rotatable pinion 360 which meshes with the rack and is operable by a squared portion 362 engageable by a wrench. The arm 356 is split at its front ends and clamping screws 364 are provided for locking the arm in place after adjustment by the pinion and rack.

Supported on the arm 356 near the left end thereof is a block 366. The block has depending flanges at the sides of the arm and a transverse screw 368 extends through the arm 356 and through the flanges, the screw carrying a knob 370. By means of the knob and the screw the block may be adjusted transversely of the arm.

Carried by the block 366 is a casting 374 which extends toward the center of the machine and is shaped to form a glue (or paste) reservoir 376. Connected with the casting 374 is a casting 378 having a bearing for a shaft 380 carrying the front glue applying wheel 352 and having a bearing for a shaft 382 which is perpendicular to the shaft 380. Bevel gears at 384 operatively connect the shafts 382 and 380. The shaft 382 is driven by a flexible shaft 386. The axis of the glue wheel 352 is preferably at an angle so that the front or outer portion of the wheel drips into glue in the reservoir 376 and so that the rear or inner portion of the wheel can directly engage a book filler at the front side thereof. Although the axis of the wheel is preferably inclined, said axis is generally upright and it is hereinafter so referred to.

As shown in FIGS. 3 and 14, the casting 378 is carried by a support member 390 which is pivoted to the casting 374 at 392. A scraper 394 is carried by the support member 390, this being closely adjacent the periphery of the wheel 352. To provide access to the reservoir 376, the member 390 and the wheel 352 can be swung upwardly about the axis 392, the flexible shaft 386 having been first disconnected from the shaft 382.

Figure 15:
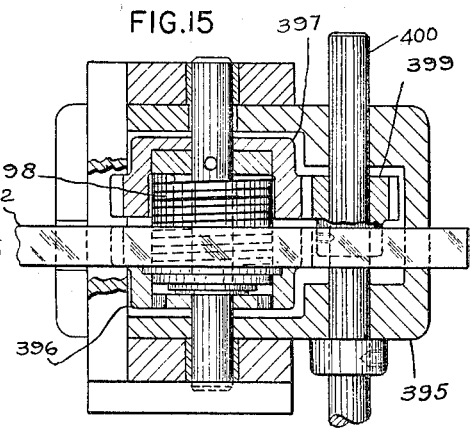
FIG. 15 is an enlarged fragmentary horizontal sectional view taken along the line 15—15 of FIG. 2A.

Suitably mounted near the center of the machine is a housing 395 in which is located a gear 396 rotatable about a transverse horizontal axis, the housing being shown in FIGS. 2A, 5 and 15. The gear 396 is connected with a similar gear 397 on the same axis by means of a unidirectional clutch 398. The gear 397 meshes with a gear 399 carried by a shaft 400 which extends across the machine. An approximately horizontal longitudinal rack 402 is pivotally connected at its left end with the oscillating lever 144. The rack meshes with and rests upon the gear 396. As the lever 144 oscillates, the rack 402 is reciprocated longitudinally and the gear 396 is rotated in opposite directions. The gear 397 is rotated during rotation of the gear 396 in counterclockwise direction, but not during rotation in the opposite direction. The gear 397 rotates the gear 399 and the shaft 400 in the clockwise direction. The before-mentioned flexible shaft 386 is connected with the shaft 400 at the front end thereof and a similar shaft 404 is connected to the shaft 400 at the rear end thereof. The flexible shafts 386 and 404 extend to and are connected respectively with the front and rear shafts 382 that rotate the glue applying wheels 352 and 353.

Figure 14A:
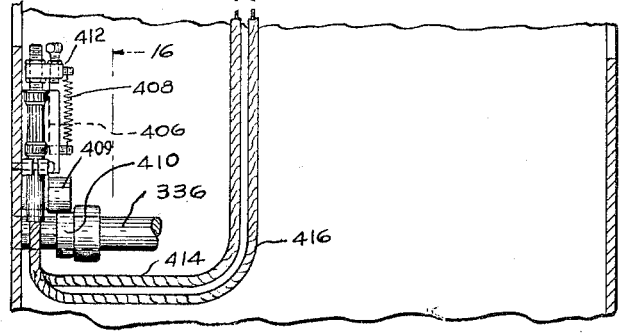
FIG. 14a is a fragmentary transverse sectional view taken along the line 14a—14a of FIG. 2A.
Figure 16:
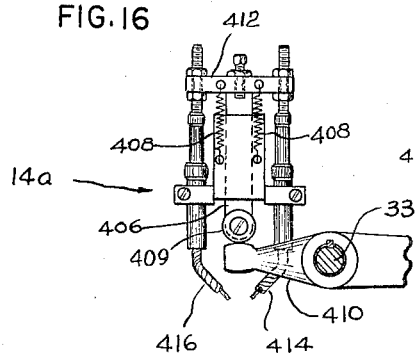

As best shown in FIGS. 2A, 14a and 16, a vertically movable slide 406 is provided on one frame wall which is shown as being the front wall 28. The slide 406 is biased for downward movement by springs 408, 408 and it is moved upwardly by an arm 410 on the rockshaft 336, said arm 410 engaging a roller 409 on said slide 406. Secured to the slide 406 at the top thereof is a crossbar 412. Connected with the crossbar 412 are the movable elements of Bowden tubes 414 and 416. The opposite ends of said movable elements are connected respectively with arms 418 and 420 on the posts 354 and 355 which carry front and rear glue applying units. The arms 418 and 412 extend toward the left, the arm 418 being shown in FIGS. 2B and 4. Each Bowden tube element is connected with its arm by means of a spring (not shown) so that pressure is applied to the arm through the spring. The arms are moved in the direction to move the wheels 352 and 353 toward each other and into engagement with a filler.

Auxiliary guide plates 424 and 426 are carried by the front and rear reservoir castings 374, 374, as best shown in FIG. 3. These guide plates are above the level of the top of the blade 102, and they serve to accurately guide each filler into position for the application of glue by the two wheels 352 and 353.

As previously explained, during each movement of the lever 144 toward the left, the pushers and the gripper jaws are moved toward the left to move the respective book fillers to the next following positions. At the same time, the rack 402 moves toward the left and rotates the gear 396 in the counterclockwise direction, the gear 399 and also the shaft 400 being rotated in the clockwise direction. The flexible shaft 386 at the front, acting through the front shaft 382 and the front bevel gears 384, rotates the wheel 352 in the counterclockwise direction as viewed in FIG. 3. Similarly, the flexible shaft 404 at the rear, acting through the rear shaft 382 and the rear bevel gears 384, rotates the wheel 353 in the clockwise direciton as viewed in FIG. 3.

As previously explained, during each downward movement of the lever 339 by the spring 342, the glue applying roller 272 is moved downwardly to engage the back of the filler and apply glue thereto. At the same time, the arm 410 is moved upwardly to move the slide 406 upwardly and to thereby swing the glue wheels 352 and 353 toward each other and into engagement with the book fillers. The timing is such that the wheels 352 and 353 are moved toward each other and into engagement with the filler at or about the time that the book filler is being first moved toward the left by the pushers 242 and 244. This is the movement from the 3rd position to the 4th position. The wheels are moved as stated by the arm 410 and by the slide 406 and the parts actuated thereby. After the filler has passed the wheels 352 and 353, the cam 338 moves the arms 337 and 410 downwardly and the wheels 352 and 353 are separated. Any necessary adjustment of the cam 338 for the length of filler engagement by the roller 272 also takes care of the length of filler engagement by the wheels 352 and 353. The cam 338 constitutes means common to the two gluing mechanisms for simultaneously adjusting the length of filler engagement by the rollers of the two mechanisms.

Preferably the timing for the wheels 352 and 353 is such that the wheels are engaged with each filler substantially simultaneously with the engagement of the rollers 272 with the preceding filler. The wheels 352 and 353 are therefore engaged with each filler shortly after the leading end has passed the wheels and are disengaged from each filler shortly before the trailing end reaches the wheels. Thus small unglued areas are left at the ends of the filler so as to avoid any overflow of glue onto the end faces of the filler.

*Filler supporting mechanism at 4th position*

A mechanism is provided at the left end of the machine for supporting each filler in its 4th or transfer position D. One such mechanism is shown generally at 428 in FIGS. 2B, 3 and 4 and is shown in detail in FIGS. 17 to 27. Another such mechanism is shown generally at 510 in FIG. 28 and is shown in detail in FIGS. 30 to 34. The description that immediately follows is applicable to said supporting mechanism 428 and also to said supporting mechanism 510.

Figure 19:
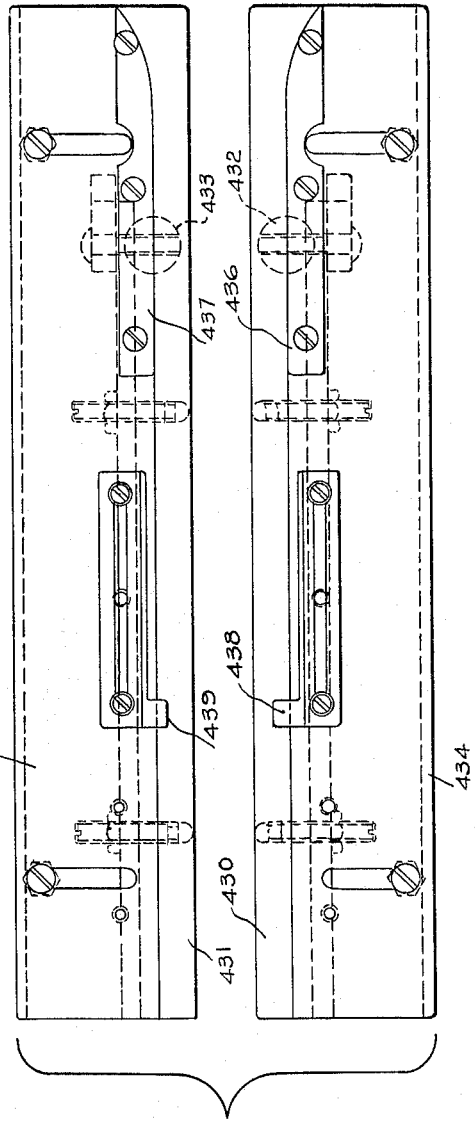
FIG. 19 is an enlarged plan view of the supporting plates at the left end of the machine.
Figure 20:
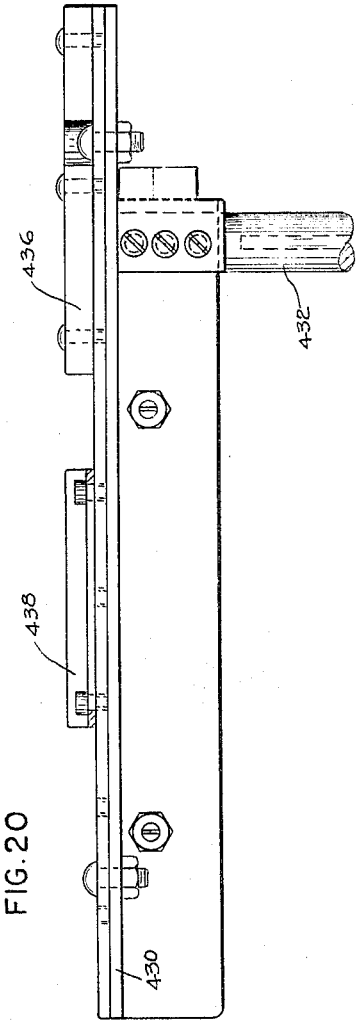
FIG. 20 is a front view of the parts shown in FIG. 19.

The supporting portion of each filler supporting mechanism is at the same level as the top of the guide rail 36, this supporting portion serving to guide and support each filler at its 4th position, which position coincides with the filler receiving station of the casing-in machine. Each said supporting portion includes two separate longitudinal supporting platforms 430 and 431 carried respectively by generally upright rods as shown in FIGS. 17, 18 and 19 or as shown in FIGS. 30 and 31. Each filler supporting mechanism also includes a vertically movable carrier below said receiving station. The rods that carry the supporting platforms are supported by the carrier at positions oppositely spaced transversely from the central vertical plane of said supporting rail 36 and of the saddle plate 18 of the casing-in machine at said receiving station.

Mounted on the platforms 430 and 431 are plates 434 and 435 having guides 436 and 437. The plates 434, 435 and the guides 436, 437 are adjustable transversely relatively to the platforms 430, 431 in accordance with the thickness of the book fillers that are being handled. The adjusted spacing between the guides 436, 437 is approximately the same as that between the main guide rails 58 and 60. Carried by the plates 434, 435 are stops 438 and 439 which serve to prevent overtravel of the book fillers when they are moved to the 4th or final positions by the pushers 242, 244. The stops are longitudinally adjustable in accordance with the length of the fillers.

The two supporting platforms 430 and 431 of each said filler supporting mechanism are initially at a level below the bottom of the saddle plates so as to permit indexing movement of said saddle plates. A means is provided which is cyclically operable after each saddle plate indexing and before each filler feeding for automatically moving the carrier upwardly and for moving said supporting platforms 430 and 431 upwardly at the sides of the saddle plate 18a which is at the receiving station. Said platforms are moved to upper positions at the level of the top of said supporting rail 36 in which positions they are adapted for guiding the filler onto said saddle plate. The means for moving the carrier and the supporting platforms upwardly is also cyclically operable after each filler feeding for automatically moving said carrier and supporting platforms downwardly to provide clearance for the next following indexing movement of the saddle plates.

Preferably each said filler supporting mechanism also includes means operable in conjunction with the upward movements of the supporting platforms 430 and 431 for moving said platforms transversely and toward each other and at least approximately into engagement with the corresponding saddle plate 18a at the filler receiving station and operable in conjunction with downward movement of the supporting platforms 430 and 431 for moving said platforms away from each other and away from said saddle plate.

*Filler supporting mechanism at 4th position FIGS. 2B, 3, 4, 17 to 27*

In the filler supporting mechanism 428, as best shown in FIGS. 17 to 27, the rods for supporting the platforms 430 and 431 are shown at 432 and 433. These rods are carried by upright bars 440 and 441 and said bars are carried by a bracket 442 secured to the left frame plate 34 of the machine. The bars 440 and 441 are guided for vertical movement with respect to the bracket 442, said bars being guided in parts by separate guide members 444 and 445 secured to said bracket. The bars 440 and 441 are movable in unison and they are connected by a block 446. The bars 440, 441 and the block 446 collectively constitute the before-mentioned vertically movable carrier. A spring 447 connected with the block 446 biases the carrier for downward movement.

A transverse horizontal shaft 448 is rotatably supported in the bracket 442. A sleeve 450 is relatively rotatable on the shaft 448 and pinions 452 and 454 are keyed to the sleeve. The bars 440 and 441 are provided with rack teeth and said teeth on the bars mesh respectively with the teeth of the pinions 452 and 454. A friction connection is provided between the shaft 448 and the sleeve 450, this connection comprising a disc 456 secured to the sleeve, a disc 458 secured to the shaft and a friction element 460 interposed between said discs. A spring 461 biases the disc 458 toward the rear, that is, toward the left as viewed in FIGS. 18 and 21, so as to maintain pressure engagement of the discs 458 and 456 with the friction element 460.

Secured to the shaft 448 near the rear end thereof is a pinion 462. A rack 464 is provided which meshes with the pinion 462 near the bottom thereof and which is pivotally connected at its right end with the oscillating lever 144. A pivoted housing 466 partly surrounds the pinion 462 and supports the rack 464 to hold it in mesh with the pinion. It will be understood that the housing 466 oscillates as the angular position of the rack 464 changes.

Rigidly secured to the bars 440 and 441 near the top thereof is a block or carrier 468 to which the rods 432 and 433 are connected for pivotal movements about longitudinal pivotal axes equally spaced from a central vertical plane through said rail 36 and said saddle plate 18a. As shown the rods are so connected by means of rockshafts 470 and 472 entered in bearing openings in the carrier, these parts being best shown in FIGS. 17, 18 and 23.

As before stated, the rail 36 is vertically adjustable, and means is therefore preferably provided for adjusting the distances between the supporting platforms 430 and 431 and the corresponding pivotal axes of the rockshafts 470, 472, so that the supporting faces of said platforms can be vertically adjusted in accordance with the vertical adjustment of the rail 36. In order to provide the required vertical adjustment of the supporting platforms, the rods 432 and 433 are secured to the rockshafts 470 and 472 by means of clamping blocks 474 and 476 which are at the left ends of the shafts. The clamping blocks are split and screws 478, 478 are provided which enable the rods 432 and 433 to be adjusted longitudinally and to be then held in adjusted positions.

Secured to the rockshafts 470 and 472 at the right ends thereof are blocks or arms 480 and 481 having rightwardly projecting flanges 482 and 483 at the bottoms thereof. A device is provided which is engageable by said arms 480, 481 as the carrier 468 is moved vertically, said device serving to pivotally move said rockshafts and rods and to thereby more the supporting platforms transversely.

As shown, the last said device includes a vertically movable slide 488 which is secured to a crossbar 486 which extends between the main frame plates. The slide 488 has vertical slots 489 therein which receive pins 490 carried by the crossbar. The slide 488 can move vertically to the extent permitted by the slots, said slide being biased downwardly by a spring 492. The slide 488 is provided with a leftwardly projecting flange 494 which is engageable by the flanges 482 and 483 on the blocks or arms 480 and 481.

FIGS. 2B, 17 and 18 show all parts in their lowermost positions with the supporting platforms 430, 431 separated from each other and at a level below the bottom of the plate 18a. A spring 496 connects the clamping blocks 474 and 476 and tends to move the platforms to their separated positions. A block 498 is carried by the rockshafts 470, 472 at the left ends thereof. Secured to the right face of the block 498 is a stop member 500 which is between the clamping blocks 474, 476 and serves to limit the movements thereof by the spring 496.

Lugs 502 and 504 are connected respectively with the supporting platforms 430, 431 and these are engageable respectively with stops 506 and 508 on the guide members 444, 445. The stops limit downward movement of the supporting platforms 430, 431 so that they are always in the disclosed relationship with the saddle plate 18a. While said supporting platforms always have the same lowermost positions, it will be observed that the lowermost position of the block 468 and of associated parts varies in accordance with the lengthwise adjustment of the rods 432, 433. The lugs 502, 504 and the stops 506, 508 have mating inclined faces which serve to maintain the supporting platforms in their said separated positions.

The timing is such that one of the saddle plates of the casing-in machine is indexed to the 18a position substantially simultaneously with the beginning of each feeding movement of the fillers in the leftward direction by the pushers and the grippers. The saddle plate 18a is relatively thick at the bottom and tapers upwardly. The top edge of the plate is at the same level as the top of the blade 102. When indexing takes place, the supporting platforms 430, 431 are in their lowermost positions and are separated from each other as shown in FIGS. 2B, 3, 4, 17 and 18.

As before stated, leftward feeding movement of the fillers is effected by leftward movement of the lever 144. The lever moves toward the left from its extreme right position, and the rack 464 similarly moves toward the left from its extreme right position. As the rack 464 moves toward the left, the pinions 462, 452 and 454 are moved in the clockwise direction as viewed in FIG. 17 and the rack bars 440 and 441 and the parts carried thereby are moved upwardly.

During the initial upward movement from the positions shown in FIGS. 17 and 18, the platforms 430 and 431 move upwardly to positions at opposite sides of the saddle plate at 18a and are spaced therefrom as shown in FIG. 24. When the flanges 482 and 483 on the blocks 480 and 481 engage the flange 494 on the slide 488, as shown in FIG. 25, the clamping blocks 474 and 476 are swung rapidly in opposition to the spring 496 so as to bring the supporting plates 430 and 431 into engagement with the saddle plate at 18a. It will be understood that the spring 492 prevents any upward movement of the slide 488 until the supporting platforms 430 and 431 have engaged the saddle plate.

As upward movement continues beyond the positions shown in FIGS. 24 and 25, the slide 488 is moved upwardly in opposition to the spring 492. During this continued upward movement, the flanges 482 and 483 additionally move the supporting platforms 430 and 431 toward each other to the extent permitted by surfaces of the upwardly tapered saddle plate 18a as shown in FIG. 26. This upward movement continues until the slide 488 reaches its uppermost position which is determined by the pins 490 as shown in FIG. 27. After the position shown in FIGS. 26 and 27 has been reached, any continued movement of the rack 464 and of the pinion 462 results in slippage at the friction connection without any further upward movement of the bars 440 and 441 and of the parts carried thereby.

The supporting platforms 430 and 431 and the rods 432 and 433 are so adjusted with respect to the clamping blocks 474 and 476 that said supporting platforms, when in their upper positions as shown in FIG. 26, are approximately at the level of the main guide rail 36. The guide bars 436 and 437 have been previously adjusted to have approximately the same spacing as the main guide rails 58 and 60.

The supporting platforms 430, 431 guide each filler to the said 4th or transfer position D, but when said position has been reached said platforms are no longer required as the filler is in position to be supported on the saddle plate 18a. When the pushers and grippers start their return movement, toward the right, movements are started which result in the return of the supporting platforms 430 and 431 to their lowermost positions.

The rack 464 simultaneously starts to move toward the right and the several pinions are moved in the counter-clockwise direction with a resultant downward movement of the rack bars 440, 441 and of the parts carried thereby. As the bars 440, 441 move downwardly, the slide 488 is moved downwardly by the spring 492 and the platforms 430, 431 are initially forced apart by the taper of the saddle plate 18a. After the slide 488 reaches its lowermost position as shown in FIG. 25, continued downward movement of the bars 440, 441 separates the flanges 482 and 483 from the flange 494 and the spring 496 acts to rapidly separate the supporting platforms 430, 431 the various parts being then restored to their lowermost positions as shown in FIGS. 17 and 18. The engagement of the lugs 502, 504 with the cam plates 506, 508 positively assures separation of the supporting platforms. Said cam plates 506, 508 also serve as stops for limiting downward movement of the rack bars 440 and 441 and their associated parts and the described friction device permits the rack 464 to continue its movement toward the right. When the support platforms 430, 431 have reached their said lowermost positions, clearance is provided for the next following index movement of the saddle plates 18 of the casing-in machine from and to the 18a position.

The frictional connection for the pinions 452, 454 and the rack bars 440, 441 enables the carrier 468 to be always moved upwardly to the same position regardless of the lengthwise adjustment of the rods 432, 433. Upward movement of the carrier 468 is always limited by the flange 494 on the slide 488, the slide being in its upper position as shown in FIGS. 26 and 27. However, downward movement of the carrier 468 is limited at different positions by the stops 502, 504, the actual positions being determined by the lengthwise adjustment of the rods 432, 433 relatively to the clamping blocks 480, 481.

*Alternative filler supporting mechanism at 4th position—FIGS. 28 to 34*

Figure 28:
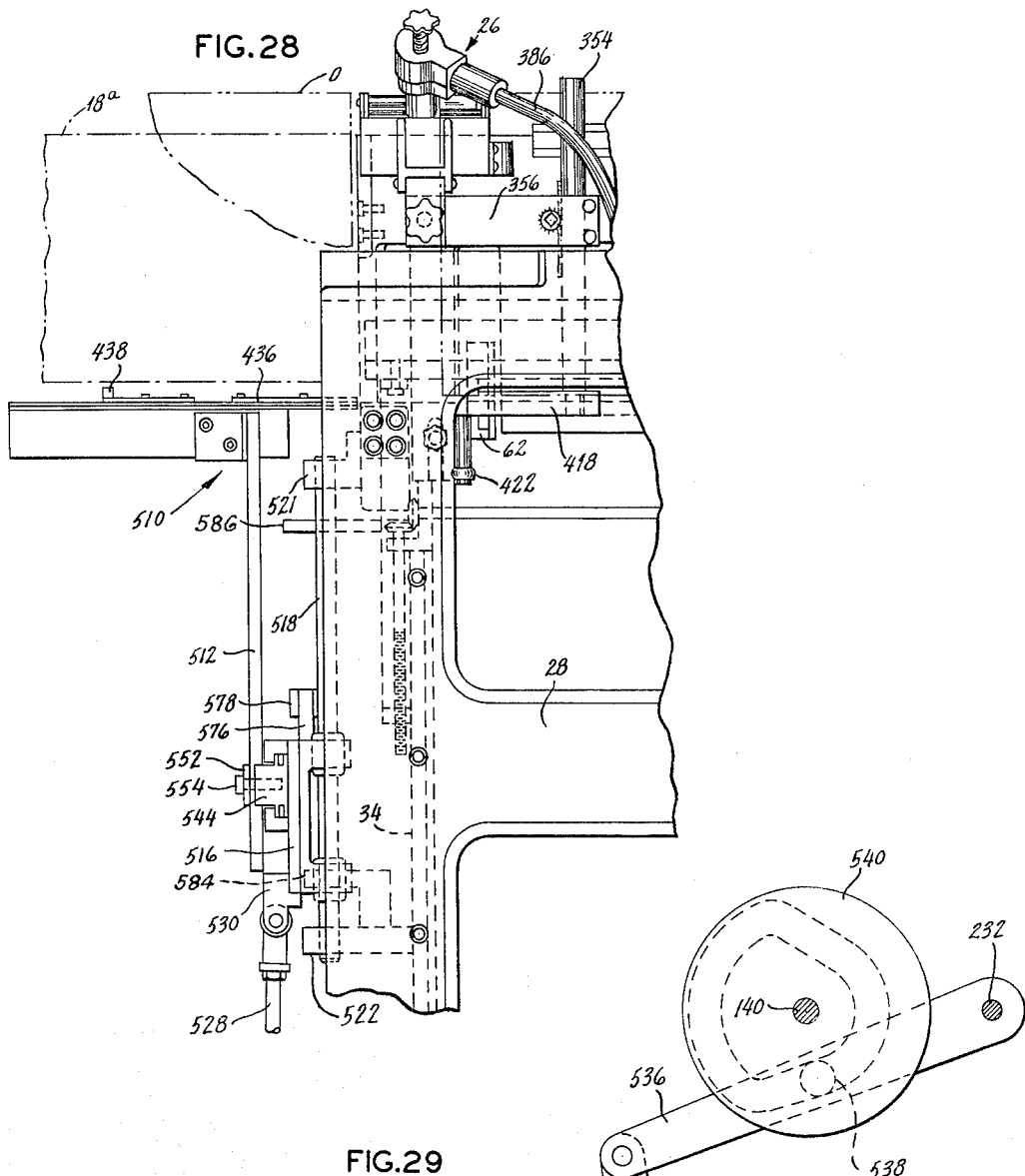
FIG. 28 is a fragmentary side view similar to the left portion of FIG. 2B, but showing an alternative filler supporting mechanism.

FIG. 28 shows a filler supporting mechanism 510 at the left end of the machine, this being an alternative to the mechanism 428 shown in FIGS. 2B, 3, 4 and 17 to 27. The mechanism 510 includes supporting platforms 430, 431 and immediately associated parts which are or may be the same as those previously described in connection with the mechanism 428.

The upright rods that support the platforms are shown at 512 and 514, and the rods are connected with a vertically reciprocable carrier 516 which is below the receiving station of the casing-in machine. The rods are oppositely spaced from the central vertical plane of said rail 36 and of the saddle plate 18 of the casing-in machine at said receiving station. The carrier 516 is guided for vertical movement by stationary guide members 518 and 520 which are connected with the left end plate 34 by means of suitable brackets 521 and 522.

Figure 29:
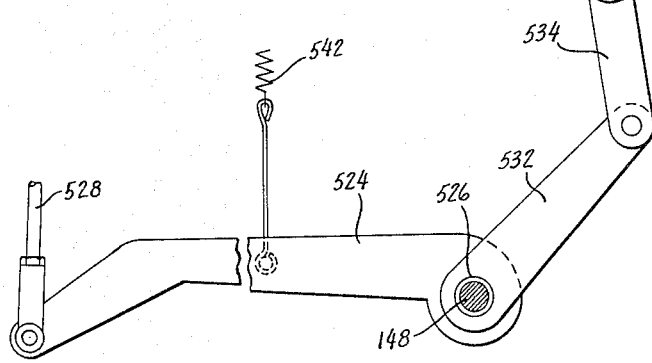
FIG. 29 is a schematic view showing the actuating elements for the supporting mechanism shown in FIG. 28.

The mechanism for vertically reciprocating the carrier 516 is shown schematically in FIG. 29. This mechanism includes an oscillating lever 524 connected at its right end to a sleeve 526 which is mounted on the shaft 148 for movement relatively thereto. A link 528 connects the left end of the lever 524 with a bracket 530 on the carrier 516. Also connected with said sleeve 526 is a lever 532 which extends toward the right. The right end of the lever 532 is connected by a link 534 with the left end of an oscillating lever 536 which is pivoted at its right end on the shaft 232 for movement relatively thereto. Connected to the lever 536 between its ends is a roller 538 which is entered in the cam track of a cam 540 secured to the main shaft 140. As the cam rotates the lever 536 is oscillated so that the link 534 causes the levers 532 and 524 to oscillate. As the lever 524 oscillates the link 526 causes the carrier 516 and its connected parts to vertically reciprocate. A spring 542 biases the lever 524 in the direction to move the carrier upwardly. The shape of the track in the cam 540 is such that the movements of the carrier are properly timed as hereinafter explained.

Means is provided for connecting upright rods 512, 514 with the carrier 516 for transverse movements in parallelism and in opposite directions. The last said means includes two blocks 544 and 546 which are guided for transverse movement between lower and upper guides 548 and 550 secured to the carrier 516. The rod 512 is connected with the block 544 by means of a clamping plate 552 and screws 554, and the rod 514 is connected with the block 546 by means of a clamping plate 556 and screws 558. When the clamping plates are loosened the rods 512, 514 may be vertically adjusted so as to vertically adjust the platforms 430, 431 in conformity with vertical adjustment of the rail 36.

Lower and upper racks 560 and 562 are connected respectively with the blocks 544, 546. As shown, the lower rack 560 is connected with the block 544 and it extends rearwardly, and the upper rack 562 is connected with the block 546 and it extends forwardly. The racks have extensions at their ends which are narrower than the main portions of the racks and which enter and fit grooves in the blocks 544, 546. As shown in FIG. 31, the forward extension on the lower rack 560 is connected with the block 544 by means of screws 564 and the rearward extension on the upper rack 562 is connected with the block 596 by means of screws 566.

A pinion device is connected with the carrier 516 for rotation about a longitudinal axis, and this device includes a pinion 568 which meshes with said racks 560, 562. The pinion 568 is connected with a longitudinal shaft 570 rotatable in a bearing aperture in the carrier 516.

The pinion device also includes a pinion 572 secured to said shaft 570 at the right side of the carrier (the left side as viewed in FIG. 32). A block 574 is secured to the carrier 516 and this block is recessed to receive the pinion 572. The block 574 serves as a guide for a vertically movable rack 576 which meshes with the pinion 572. A block 578 is connected to the rack 576 at the upper end thereof. A spring 580 is interposed between the block 578 and the block 574 and this spring tends to hold the rack 576 in its uppermost position with respect to the carrier. A suitable stop (not shown) prevents relative upward movement of the rack beyond the position shown in FIG. 31.

Preferably a block 582 is connected to the rack 576 at the lower end thereof. When the carrier 516 is in its lower position, as shown in FIGS. 31 and 32, a stop 584 on the bracket 522 engages the block 582 to hold the rack 576 in its uppermost position with respect to the carrier. The rack is thus so held independently of the spring 580.

FIGS. 28, 30, 31 and 32 show all of the parts in their lowermost positions with the supporting platforms 430, 431 separated from each other and at a level below the bottom of the plate 18a. The shape and position of the cam 540 is such that the carrier 516 and connected parts are moved upwardly immediately after indexing of a saddle plate to the 18a position. Initially the spring 580 moves the rack 576 upwardly in unison with the carrier 516, and it is so moved until the block 578 engages a stationary stop 586, as shown in FIG. 33. With the parts so positioned, the supporting plates 430, 431 are at the sides of the saddle plate 18a as shown, but they are spaced from the saddle plate.

As the carrier continues to move upwardly beyond the FIG. 33 position, the rack is held stationary and the spring 580 is compressed. The pinion 572 rolls along the rack in the clockwise direction, and this causes the pinion 568 to correspondingly turn in the clockwise direction with resultant movement of the rack 560 and connected parts toward the left and of the rack 562 and connected parts toward the right. In moving from the FIG. 33 positions to the FIG. 34 positions, the supporting platforms 430, 431 are moved upwardly and are also moved toward each other at least approximately into engagement with the saddle plate 18a. It will be understood that the supporting platforms have previously been so adjusted with respect to the carrier 16 that they are at the level of the top of the rail 36 when the FIG. 34 positions are reached.

When the carrier is thereafter moved downwardly, the described motions are reversed and the rack 576 is moved to its uppermost relative position by means of the spring 580. In the event of failure of the spring to so move the rack 576, the rack would be moved to its uppermost position by the engagement of the block 582 with the stop 578.

*Timing of filler supporting mechanism at 4th position*

With either the mechanism 428 or the mechanism 510, the timing is such that a plate of the casing-in machine is indexed to the 18a position, substantially simultaneously with the start of the movement of a book filler, by the pushers 242, 244 from the 3rd position, shown at C in FIG. 2B, to the 4th or transfer position shown at D. The maximum length of book filler that the machine is adapted to handle is substantially less than the length of travel of the pushers and the grippers. As an example, the length of travel of the pushers and grippers may exceed the maximum filler length by a distance $x$, shown in FIG. 2B. Each filler of maximum length, when in the 3rd position would be spaced by the distance $x$ from the juncture point between the rail 36 and the supporting platforms 430, 431. Said filler would therefore move through the distance $x$ before reaching said juncture point. During the travel of the pushers and grippers through said distance $x$, the supporting platforms must move upwardly from the lower positions shown in FIGS. 17 and 18 or in FIGS. 30 and 31 to their upper positions shown in FIG. 26 or in FIG. 34 so as to be ready to receive the filler that is being moved from the 3rd position to the 4th or transfer position as shown in FIG. 2B.

The invention claimed is:

1. A feeding apparatus for use with a cyclically operable book casing-in machine having a plurality of vertically reciprocable upright saddle plates uniformly spaced about a vertical axis and having means operable during each cycle for indexing said plates about said axis to move them successively to and from a book filler receiving station, said feeding apparatus comprising in combination: a horizontal rail normally positioned in longitudinal register with a saddle plate of said machine at said receiving station, said rail being adapted to support a succession of book fillers in vertical positions with their backs facing upwardly, means connectible with said casing-in machine and operable in synchronism therewith during each cycle for engaging successive fillers and for feeding them along the rail and toward said machine, said filler engaging and feeding means being so constructed and timed that each filler is moved to a transfer position beyond the end of the rail and coinciding with the filler receiving station of the casing-in machine immediately after the indexing of a saddle plate of said machine to said receiving station, and two longitudinal filler supporting platforms adjacent said end of the rail and oppositely spaced transversely from the central vertical plane of said rail and of the saddle plate at said receiving station, said platforms being normally at a level below the bottom of said saddle plate to permit indexing movement thereof, and means cyclically operable after each saddle plate indexing and before each filler feeding for automatically moving said supporting platforms upwardly at the sides of the saddle plate at the receiving station and to upper positions at the level of the top of said rail in which positions they are adapted for guiding the filler onto said saddle plate, the last said means being also cyclically operable after each filler feeding for automatically moving said supporting platforms downwardly to provide clearance for the next following indexing movement of the saddle plates.

2. A feeding apparatus as set forth in claim 1, including means cyclically operable in conjunction with the upward movements of the supporting platforms for moving them transversely and toward each other and at least approximately into engagement with the saddle plate at the filler receiving station and cyclically operable in conjunction with downward movement of the supporting platforms for moving them away from each other and away from said saddle plate.

3. A feeding apparatus as set forth in claim 1, wherein means is provided for vertically adjusting the horizontal rail in accordance with the width of the books that are to be fed, and wherein means is provided for vertically adjusting the level of the upper positions of the supporting platforms in accordance with the vertical adjustment of the rail.

4. A feeding apparatus for use with a cyclically operable book casing-in machine having a plurality of vertically reciprocable upright saddle plates uniformly spaced about a vertical axis and having means operable during each cycle for indexing said saddle plates about said axis to move them successively to and from a book filler receiving station, said feeding apparatus comprising in combination: a horizontal rail normally positioned in longitudinal register with a saddle plate of said casing-in machine at said receiving station, said rail being adapted to support a succession of book fillers in vertical positions with their backs facing upwardly, means connectible with said casing-in machine and operable in synchronism therewith during each cycle for engaging successive fillers and for feeding them along the rail and toward said machine, said filler engaging and feeding means being so constructed and timed that each filler is moved to a transfer position immediately after the indexing of a saddle plate of the machine to said receiving station which transfer position is beyond the end of the rail and coincides with the filler receiving station of the casing-in machine, a vertically reciprocable carrier below said filler receiving station, two generally upright supporting rods, means for connecting the rods with the carrier for movement relatively thereto which rods are oppositely spaced from the central vertical plane of said rail and of a saddle plate at said receiving station, two longitudinal filler supporting platforms secured to the respective rods at the upper ends thereof, said platforms being normally at a level below the bottom of said saddle plate to permit indexing thereof, means cyclically operable after each saddle plate indexing and before each filler feeding for automatically moving said carrier upwardly and for thereby moving said rods and supporting platforms upwardly so that the platforms are in positions at the sides of the saddle plate and at the level of the top of said rail, and means cyclically operable after an initial upward movement of said carrier for moving said rods relatively to the carrier and in the directions to move said platforms toward each other and at least approximately into engagement with said saddle plate, said means for moving the carrier upwardly and said means for moving the rods and platforms relatively to the carrier being cyclically operable reversely after each filler feeding so as to restore the several parts to their initial positions and so as to provide clearance for the next following saddle plate indexing.

5. A feeding apparatus as set forth in claim 4, wherein means is provided for vertically adjusting the horizontal rail in accordance with the width of the books that are to be fed, and wherein means is provided for adjusting the distances between the supporting platforms and the carrier in accordance with the vertical adjustment of the rail.

6. A feeding apparatus as set forth in claim 4, wherein the means for connecting the rods with the carrier is constructed and arranged to guide said rods for movement in parallelism when they are moved relatively to the carrier.

7. A feeding apparatus as set forth in claim 6, wherein two transversely movable racks are connected respectively with said rods, and wherein the means for moving the rods relatively to the carrier includes a pinion device rotatable relatively to the carrier and about a longitudinal axis and meshing with said racks.

8. A feeding apparatus as set forth in claim 7, wherein mechanism is included for rotating said pinion device in the direction to move the racks and the rods and the supporting platforms toward each other which mechanism is normally inactive, and wherein means is included for actuating the last said mechanism when the carrier and the rods and the supporting platforms have been moved upwardly to predetermined positions.

9. A feeding apparatus as set forth in claim 8, wherein the said mechanism for rotating said pinion device includes a vertical rack meshing with said pinion device and normally movable vertically in unison with said carrier, and a stop for limiting upward movement of said vertical rack so that continued upward movement of the carrier causes the pinion device to roll along said vertical rack and thus effect movement of the transverse racks and the rods and the supporting platforms toward each other.

10. A feeding apparatus for use with a cyclically operable book casing-in machine having a plurality of vertically reciprocable upright saddle plates uniformly spaced about a vertical axis and having means operable during each cycle for indexing said saddle plates about said axis to move them successively to and from a book filler receiving station, said feeding apparatus comprising in combination: a horizontal rail normally positioned in longitudinal register with a saddle plate of said casing-in machine at said receiving station, said rail being adapted to support a succession of book fillers in vertical positions with their backs facing upwardly, means connectible with said casing-in machine and operable in synchronism therewith during each cycle for engaging successive fillers and for feeding them along the rail and toward said machine, said filler engaging and feeding means being so constructed and timed that each filler is moved to a transfer position immediately after the indexing of a saddle plate of the machine to said receiving station which transfer position is beyond the end of the rail and coincides with the filler receiving station of the casing-in machine, a vertically reciprocable carrier below said filler receiving station, two generally upright supporting rods, means for connecting the rods with the carrier for pivotal movements relatively thereto about longitudinal axes oppositely spaced from a vertical plane through the center of said rail and the center of a saddle plate at said receiving station, two longitudinal filler supporting platforms secured to the respective rods at the upper ends thereof, said platforms being normally at a level below the bottom of said saddle plate to permit indexing thereof, means cyclically operable after each saddle plate indexing and before each filler feeding for automatically moving said carrier upwardly and for thereby moving said rods and supporting platforms upwardly so that the platforms are in positions at the sides of the saddle plate and at the level of the top of said rail, and means cyclically operable after an initial upward movement of said carrier for moving said rods about their said pivotal axes in the directions to move said platforms toward each other and at least approximately into engagement with said saddle plate, said means for moving the carrier upwardly and said means for moving the rods and platforms about their pivotal axes being cyclically operable reversely after each filler feeding so as to restore the several parts to their initial positions and so as to provide clearance for the next following saddle plate indexing.

11. A feeding apparatus as set forth in claim 10 and adapted for use with a casing-in machine having saddle plates which are relatively wide at their bottoms and which taper upwardly, wherein the means for moving the rods about their pivotal axes is constructed and arranged to move the rods as stated after an initial upward movement of the carrier and to additionally move the rods in the same directions during the final upward movement of the carrier so that the platforms are additionally moved toward each other in accordance with the taper of the saddle plate.

12. A feeding apparatus as set forth in claim 11, wherein means is provided for vertically adjusting the horizontal rail in accordance with the width of the books that are to be fed, and wherein means is provided for adjusting the distances between the supporting platforms and the corresponding pivotal axes in accordance with the vertical adjustment of the rail.

13. A feeding mechanism as set forth in claim 10, wherein two longitudinal rockshafts are provided on said vertically movable carrier and wherein the rods are respectively connected to the shafts, wherein two arms are respectively connected with the shafts, and wherein a device is provided which is engageable by said arms as the carrier is moved vertically, said device serving to pivotally move said rockshafts and rods and to thereby move the supporting platforms in the manner stated.

14. A feeding apparatus as set forth in claim 13, wherein means is provided for vertically adjusting the horizontal rail in accordance with the width of the books that are to be fed, and wherein the rods are adjustable lengthwise with respect to the shafts so as to adjust the level of the upper positions of the supporting platforms in accordance with the vertical adjustment of the rail.

15. A feeding apparatus as set forth in claim 14, wherein the means for moving the carrier upwardly and downwardly is constructed and arranged to move said carrier upwardly always to the same position regardless of the lengthwise adjustment of the rods and is further constructed and arranged to move said carrier downwardly to different positions which are determined by said lengthwise adjustment of rods.

16. A feeding apparatus as set forth in claim 15, wherein the means for engaging and feeding the fillers includes a lever which is oscillated about a transverse axis, and wherein the means for vertically moving the carrier includes a vertical rack and a pinion meshing with said rack and rotatable about a transverse horizontal axis and further includes a second pinion coaxial with the first said pinion and having a frictional connection therewith and still further includes a generally longitudinal rack pivotally connected with said lever and meshing with said second pinion.

17. A feeding and gluing apparatus for use with a cyclically operable book casing-in machine having a book filler receiving station, a horizontal filler supporting rail adapted to be positioned in longitudinal register with the receiving station of said machine which rail is adapted to support a succession of book fillers in vertical positions with their backs facing upwardly, said rail having a central longitudinal slot therein throughout a major portion of its length, means operable during each cycle of the casing-in machine for engaging successive fillers and for feeding said fillers toward said machine and successively to a plurality of stations uniformly spaced along the rail the last of which stations coincides with the receiving station of the machine, a glue mechanism located above the rail and automatically operable during movement of a filler from one station to the next following station which mechanism serves to apply glue to the upwardly facing back of each filler during the last said movement thereof, said glue mechanism including a roller rotatable about a horizontal transverse axis and movable downwardly into a filler engaging position after the leading end of the filler to be glued has passed said roller and movable upwardly out of said filler engaging position before the trailing end of the glued filler reaches said roller, a vertical longitudinal filler supporting blade extending through said longitudinal slot in the rail and adapted to centrally split each filler to support said filler in position for receiving glue from said gluing mechanism, and means for vertically adjusting the rail independently of the supporting blade to adapt the apparatus for fillers of different widths.

18. A feeding and gluing apparatus as set forth in claim 18, including a filler splitting blade in fixed position on the rail and adjustable therewith which splitting blade is adjacent the trailing end of said supporting blade.

19. A feeding and gluing apparatus for use with a cyclically operable book casing-in machine having a book filler receiving station, a horizontal filler supporting rail adapted to be positioned in longitudinal register with the receiving station of said machine, said rail being adapted to support a succession of book fillers in vertical positions with their backs facing upwardly, longitudinally reciprocable means operable during each cycle of the casing-in machine for engaging successive fillers and for feeding said fillers toward said machine and successively to a plurality of stations uniformly spaced along the rail the last of which stations coincides with the receiving station of the machine, a gluing mechanism located above the rail and automatically operable to apply glue to the upwardly facing back of each filler during movement of the filler from one station to the next following station, said glue mechanism including a roller rotatable about a horizontal transverse axis and movable downwardly into a filler engaging position after the leading end of the filler to be glued has passed said roller and movable upwardly out of said filler engaging position before the trailing end of the glued filler reaches said roller, a vertical longitudinal filler supporting blade extending upwardly from the rail at the center thereof and adapted to centrally split each filler and to support said filler in position for receiving glue from said gluing mechanism, two longitudinal guide rails at the sides of the supporting rail and equally spaced from said supporting blades, and means for simultaneously and equally adjusting said guide rails transversely for fillers of different thicknesses.

20. A feeding and gluing apparatus as set forth in claim 19, wherein the upper face of said supporting rail is convexly curved in transverse section, and wherein the means for transversely adjusting the guide rails is constructed to enable said guide rails to move upwardly and downwardly in accordance with the curvature of the upper face of the supporting rail.

21. A feeding and gluing apparatus for use with a cyclically operable book casing-in machine having a book filler receiving station, a horizontal filler supporting rail adapted to be positioned in longitudinal register with the receiving station of said machine, said rail being adapted to support a succession of book fillers in vertical positions with their backs facing upwardly, longitudinally reciprocable means operable during each cycle of the casing-in machine for engaging successive fillers and for feeding said fillers toward said machine and successively to a plurality of stations uniformly spaced along the rail the last of which stations coincides with the receiving station of the machine, a gluing mechanism located above the rail and automatically operable to apply glue to the upwardly facing back of each filled during movement of the filler from one station to the next following station, said glue mechanism including a roller rotatable about a horizontal transverse axis and movable downwardly into a filler engaging position after the leading end of the filler to be glued has passed said roller and movable upwardly out of said filler engaging position before the trailing end of the glued filler reaches said roller, a vertical longitudinal filler supporting blade extending upwardly from the rail at the center thereof and adapted to centrally split each filler and to support said filler in position for receiving glue from said gluing mechanism, and longitudinal guide elements located above the level of the top of the supporting blade and adjacent the gluing mechanism, said guide elements being equally spaced from the central vertical plane thereof so as to engage the sides of the successive fillers during action of said gluing mechanism.

22. A feeding and gluing apparatus as set forth in claim 21, wherein means is provided for simultaneously and equally adjusting said longitudinal guide elements transversely for fillers of different thicknesses.

23. A feeding and gluing apparatus as set forth in claim 21, wherein said guide elements are longitudinally movable jaws which constitute a portion of said longitudinally reciprocable filler feeding means, and wherein means is provided for moving said jaws transversely into filler engaging positions prior to each filler feeding action and for thereafter moving said jaws out of said filler engaging positions.

References Cited by the Examiner

UNITED STATES PATENTS

| | | | |
|---|---|---|---|
| 1,410,498 | 3/1922 | Murray | 118—243 X |
| 1,508,981 | 9/1924 | Kerlin | 118—243 X |
| 1,762,927 | 6/1930 | Manny | 198—133 X |
| 1,765,349 | 6/1930 | Schramm et al. | 11—3 |
| 1,848,138 | 3/1932 | Novick | 118—1 |
| 1,851,135 | 3/1932 | Schramm | 11—3 |
| 1,886,231 | 11/1932 | Sague | 118—243 X |
| 1,931,244 | 10/1933 | Alger et al. | 118—223 |
| 1,993,154 | 3/1935 | Elkington | 198—221 |
| 2,613,375 | 10/1952 | Smith et al. | 118—216 X |
| 2,777,562 | 1/1957 | McCahon et al. | 198—133 X |
| 3,009,180 | 11/1961 | Schramm | 11—3 |
| 3,052,210 | 9/1962 | Hughes | 118—241 X |

MORRIS KAPLAN, *Primary Examiner.*

RICHARD D. NEVIUS, *Examiner.*

J. REBOLD, J. A. HAUG, *Assistant Examiners.*